United States Patent
Akiyama et al.

(10) Patent No.: US 8,891,174 B2
(45) Date of Patent: Nov. 18, 2014

(54) ZOOM LENS AND PROJECTOR USING THE SAME

(71) Applicant: Canon Kabushiki Kaisha, Tokyo (JP)

(72) Inventors: Yusuke Akiyama, Utsunomiya (JP); Saburo Sugawara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/025,568

(22) Filed: Sep. 12, 2013

(65) Prior Publication Data

US 2014/0078598 A1    Mar. 20, 2014

(30) Foreign Application Priority Data

Sep. 14, 2012 (JP) ................ 2012-203003

(51) Int. Cl.
   *G02B 15/14* (2006.01)
   *G02B 15/173* (2006.01)
(52) U.S. Cl.
   CPC .............. *G02B 15/14* (2013.01); *G02B 15/173* (2013.01)
   USPC .......................................... 359/687; 359/683
(58) Field of Classification Search
   CPC .............. G02B 15/14; G02B 15/173
   USPC ................................. 359/683, 687
   See application file for complete search history.

(56) References Cited

U.S. PATENT DOCUMENTS

| 4,452,513 A | * | 6/1984 | Hamanishi | 359/693 |
| 6,124,972 A | * | 9/2000 | Hayakawa et al. | 359/557 |
| 8,040,614 B2 | * | 10/2011 | Matsunaga et al. | 359/686 |

FOREIGN PATENT DOCUMENTS

| JP | 2003-241096 A | 8/2003 |
| JP | 2003-287680 A | 10/2003 |
| JP | 2005-309061 A | 11/2005 |

* cited by examiner

*Primary Examiner* — Scott J Sugarman
(74) *Attorney, Agent, or Firm* — Canon USA Inc. IP Division

(57) ABSTRACT

A zoom lens includes, in order from an enlargement side to a reduction side, a first lens unit having positive refractive power and not moving for zooming, a second lens unit having negative refractive power and moving for zooming, a stop, a zooming lens unit having positive refractive power and moving for zooming, and a final lens unit having positive refractive power and not moving for zooming. During zooming from a wide-angle end to a telephoto end, the second lens unit moves to the reduction side and the zooming lens unit moves to the enlargement side. The zooming lens unit includes a cemented lens. The cemented lens includes a negative lens and a positive lens cemented in order from the enlargement side. A cemented surface of the cemented lens has a convex shape on the enlargement side. The zoom lens satisfies predetermined conditions.

6 Claims, 27 Drawing Sheets

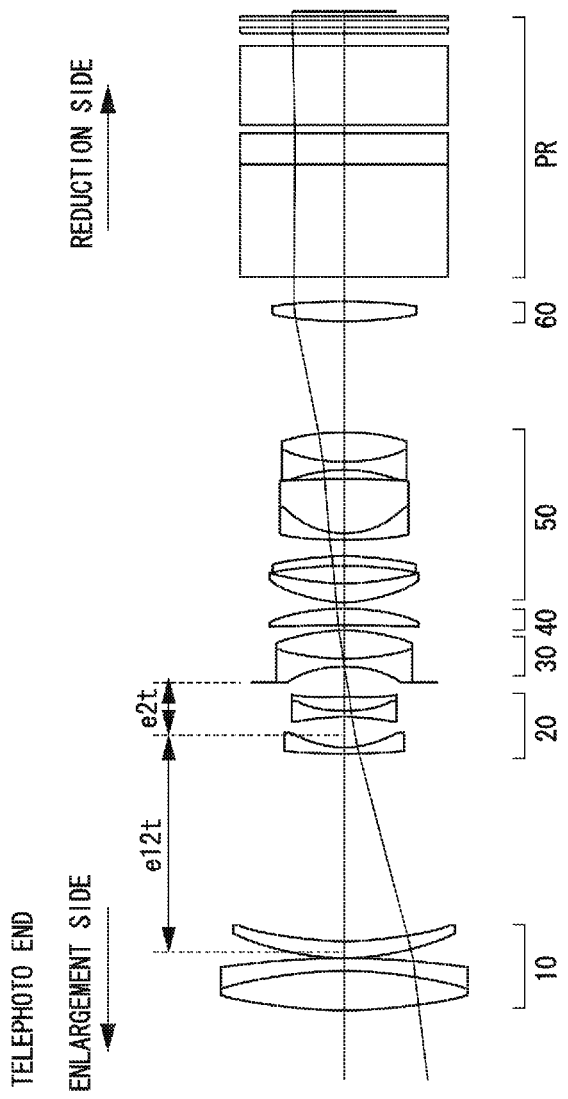

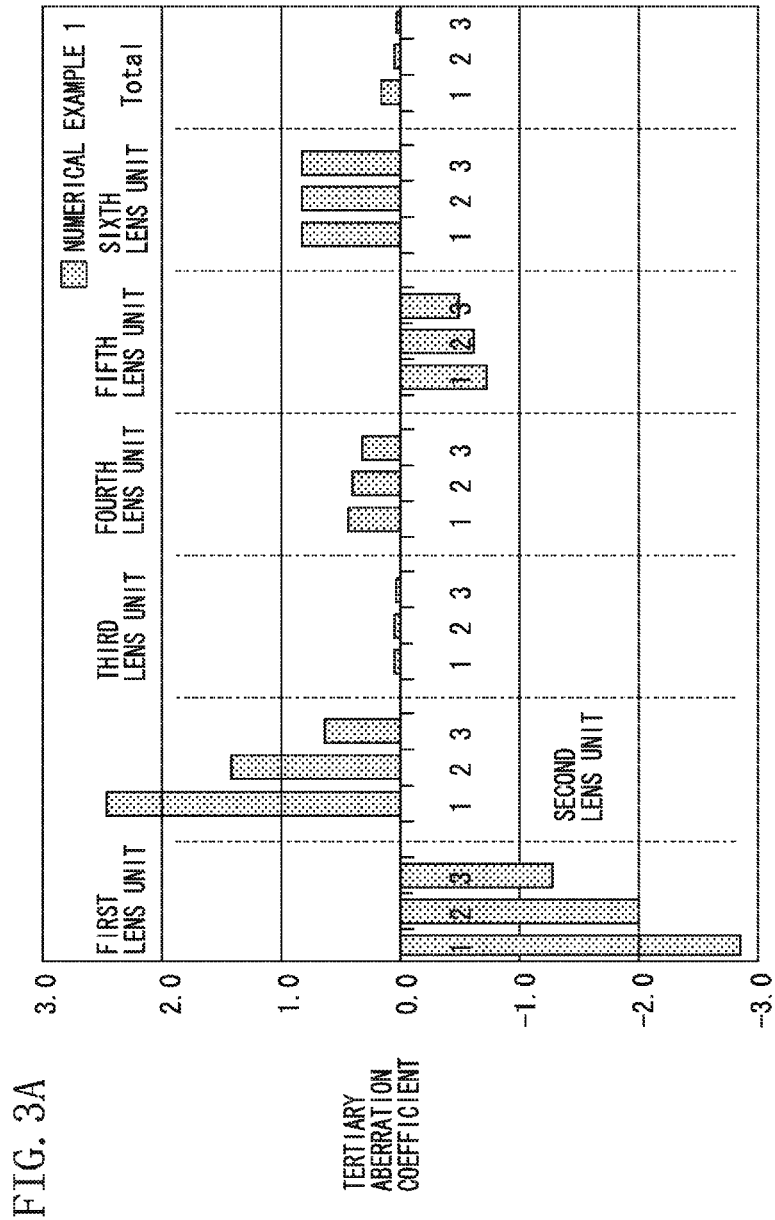

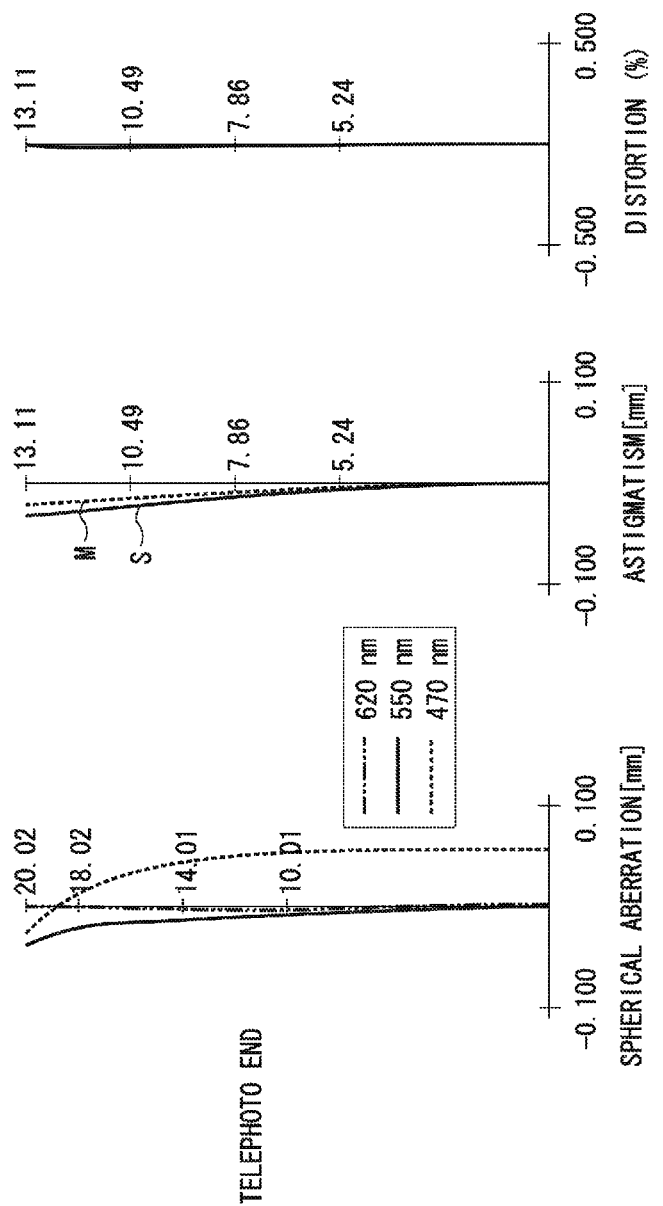

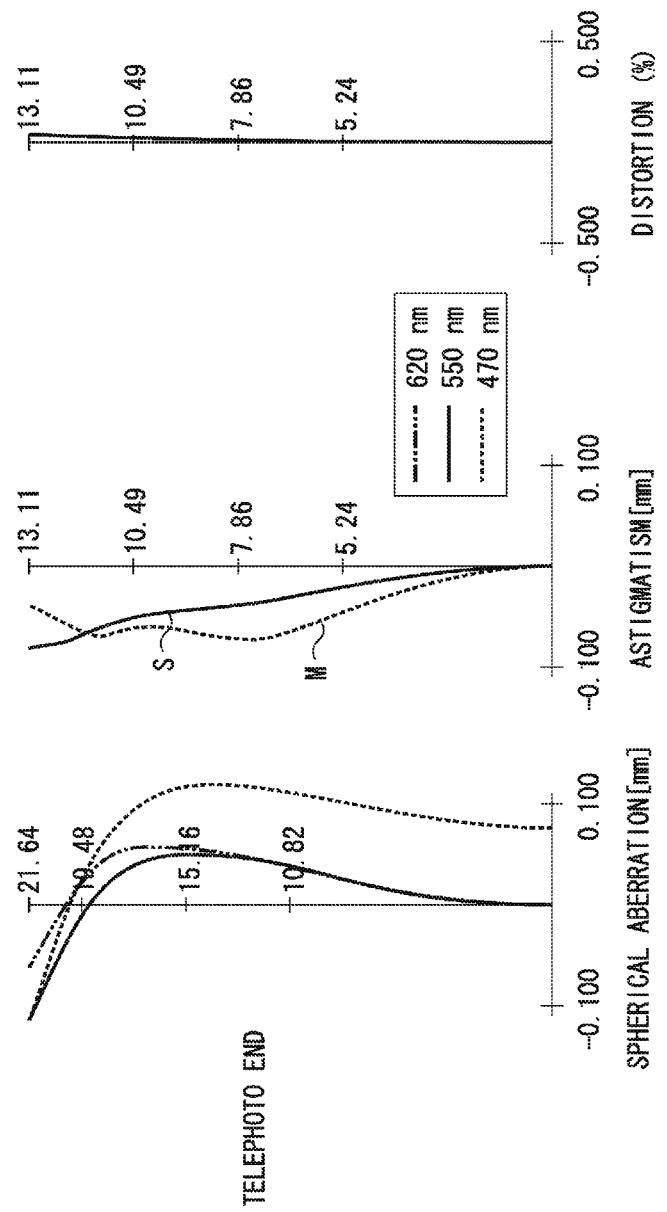

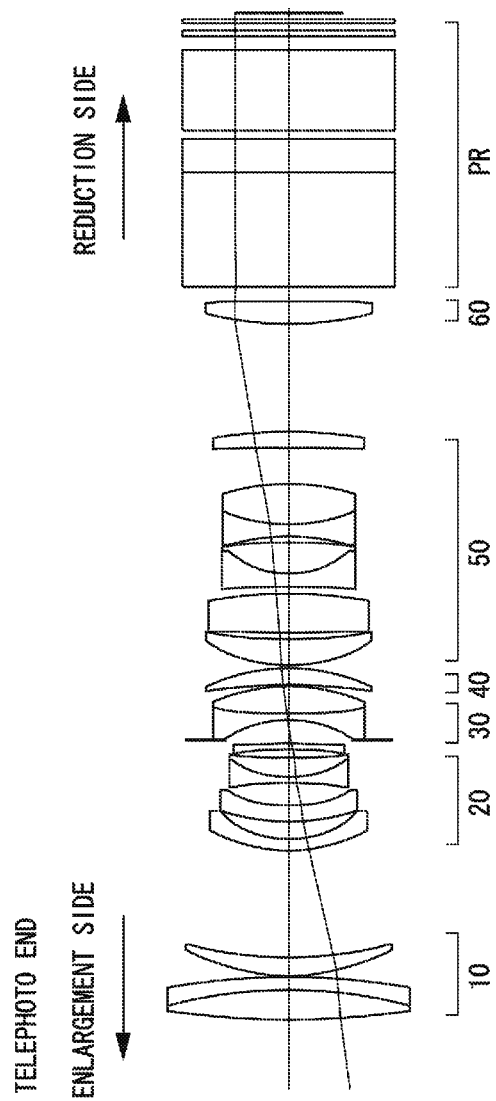

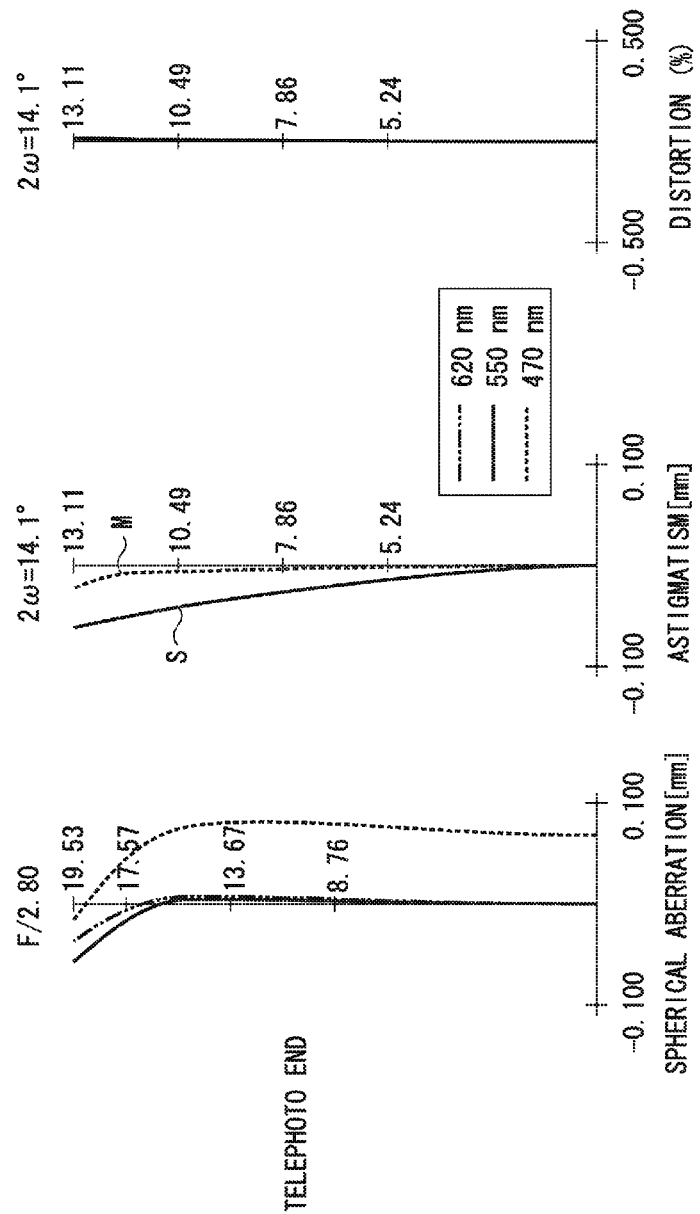

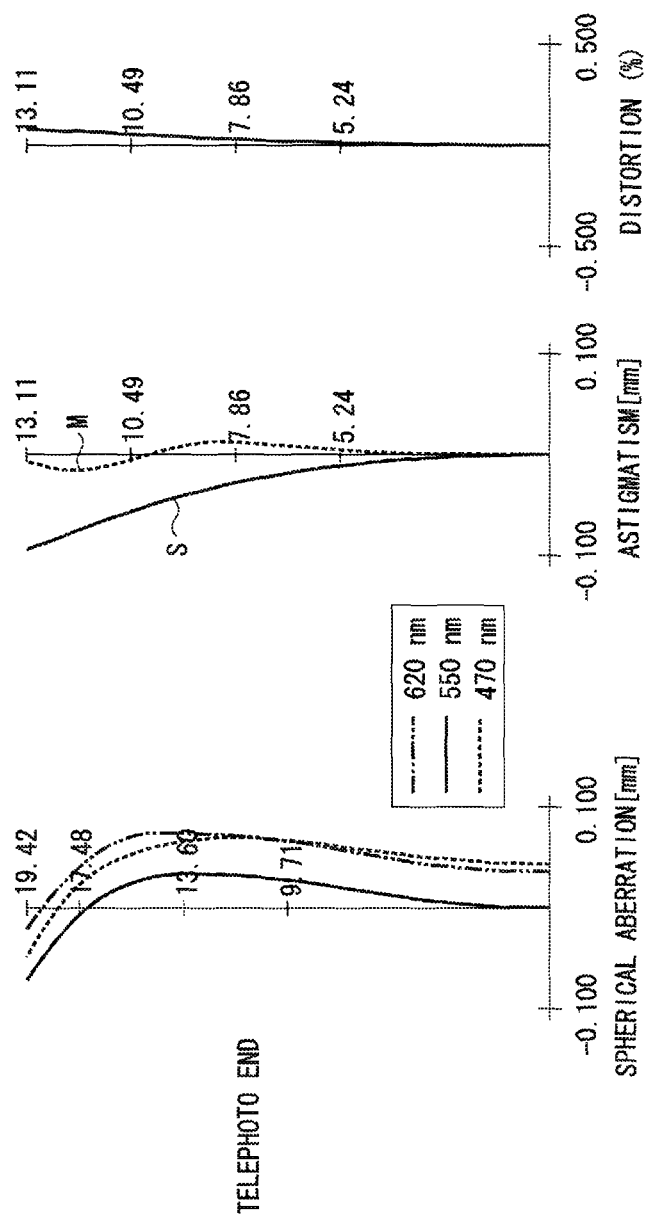

WHEN APPLIED TO LIQUID-CRYSTAL PROJECTOR

ZOOM LENS AND PROJECTOR USING THE SAME

BACKGROUND OF THE INVENTION

1. Field of the Invention

The present invention relates to a zoom lens, and in particular to a zoom lens suitable for a projector which enlarges and projects an image, and a projector using such a zoom lens.

2. Description of the Related Art

Conventionally, there is a zoom lens of positive lead type in which a lens having positive refractive power is disposed on the most enlargement side to prevent the aperture of a lens disposed on the enlargement side from becoming large.

Japanese Patent Application Laid-Open No. 2003-287680 discusses a zoom lens including six lens units respectively having positive, negative, negative, positive, positive, and positive refractive power disposed in order from the enlargement side, which is the screen side, toward the reduction side, which is the liquid crystal panel side. During zooming from the wide-angle end to the telephoto end, the second lens unit moves to the reduction side, and the third lens unit, the fourth lens unit, and the fifth lens unit move to the enlargement side.

Furthermore, Japanese Patent Application Laid-Open No. 2003-241096 and Japanese Patent Application Laid-Open No. 2005-309061 discuss a zoom lens of positive lead type including five lens units in which the first lens unit having positive refractive power is disposed on the most enlargement side.

SUMMARY OF THE INVENTION

According to an aspect of the present invention, a zoom lens includes, in order from an enlargement side to a reduction side, a first lens unit having positive refractive power and being stationary for zooming, a second lens unit having negative refractive power and moving for zooming, a stop, a zooming lens unit having positive refractive power and moving for zooming, and a final lens unit having positive refractive power and being stationary for zooming, wherein during zooming from a wide-angle end to a telephoto end, the second lens unit moves to the reduction side and the zooming lens unit moves to the enlargement side, the zooming lens unit includes a cemented lens, the cemented lens has a negative lens and a positive lens cemented in order from the enlargement side, and a cemented surface of the cemented lens has a convex shape on the enlargement side, the zoom lens satisfies $$0.15 < Nn - Np < 0.35$$

where a refractive index of the negative lens is denoted by $Nn$ and a refractive index of the positive lens is denoted by $Np$, and the zoom lens satisfies $$0.15 < e12w/L < 0.25$$

$$0.15 < e2w/L < 0.25$$

$$0.25 < e12t/L < 0.40$$

$$0.03 < e2t/L < 0.11$$

where a distance between a principal point of the first lens unit and a principal point of the second lens unit at the wide-angle end is denoted by $e12w$, a distance between the principal point of the second lens unit and the stop at the wide-angle end is denoted by $e2w$, a distance between a principal point of the first lens unit and a principal point of the second lens unit at the telephoto end is denoted by $e12t$, a distance between the principal point of the second lens unit and the stop at the telephoto end is denoted by $e2t$, and a distance between a surface vertex on the enlargement side of a lens disposed on the most enlargement side and a surface vertex on the reduction side of a lens disposed on the most reduction side is denoted by $L$.

Further features of the present invention will become apparent from the following description of exemplary embodiments with reference to the attached drawings.

BRIEF DESCRIPTION OF THE DRAWINGS

FIGS. 1A and 1B are sectional views of a zoom lens and an optical element disposed between the zoom lens and a light modulation element according to a first exemplary embodiment of the present invention.

FIGS. 3A and 3B are diagrams illustrating distortion of third-order aberration coefficients according to the numerical example 1 and a comparative example.

FIGS. 7A and 7B are aberration diagrams of the zoom lens at a wide-angle end and a telephoto end according to a numerical example 3 of the present invention.

FIGS. 9A and 9B are aberration diagrams of the zoom lens at a wide-angle end and a telephoto end according to a numerical example 4 of the present invention.

FIGS. 10A and 10B are sectional views of a zoom lens and an optical element disposed between the zoom lens and a light modulation element according to a fifth exemplary embodiment of the present invention.

FIGS. 11A and 11B are aberration diagrams of the zoom lens at a wide-angle end and a telephoto end according to a numerical example 5 of the present invention.

FIGS. 13A and 13B are aberration diagrams of the zoom lens at a wide-angle end and a telephoto end according to a numerical example 6 of the present invention.

DESCRIPTION OF THE EMBODIMENTS

The conventional examples have a problem that negative distortion is generated at the wide-angle end. Furthermore, even if the distortion at the wide-angle end is reduced, distortion at the telephoto end is generated. In other words, the known examples have a problem that correction of distortion in the whole area of zoom is not sufficient. Therefore, exemplary embodiments, described below, of the present invention are directed to a zoom lens and a projector (image projection apparatus) in which such a problem is solved.

Hereafter, a first exemplary embodiment of the present invention will be described with reference to FIGS. 1A and 1B, FIGS. 2A and 2B, and FIGS. 3A and 3B.

Figure 1A:
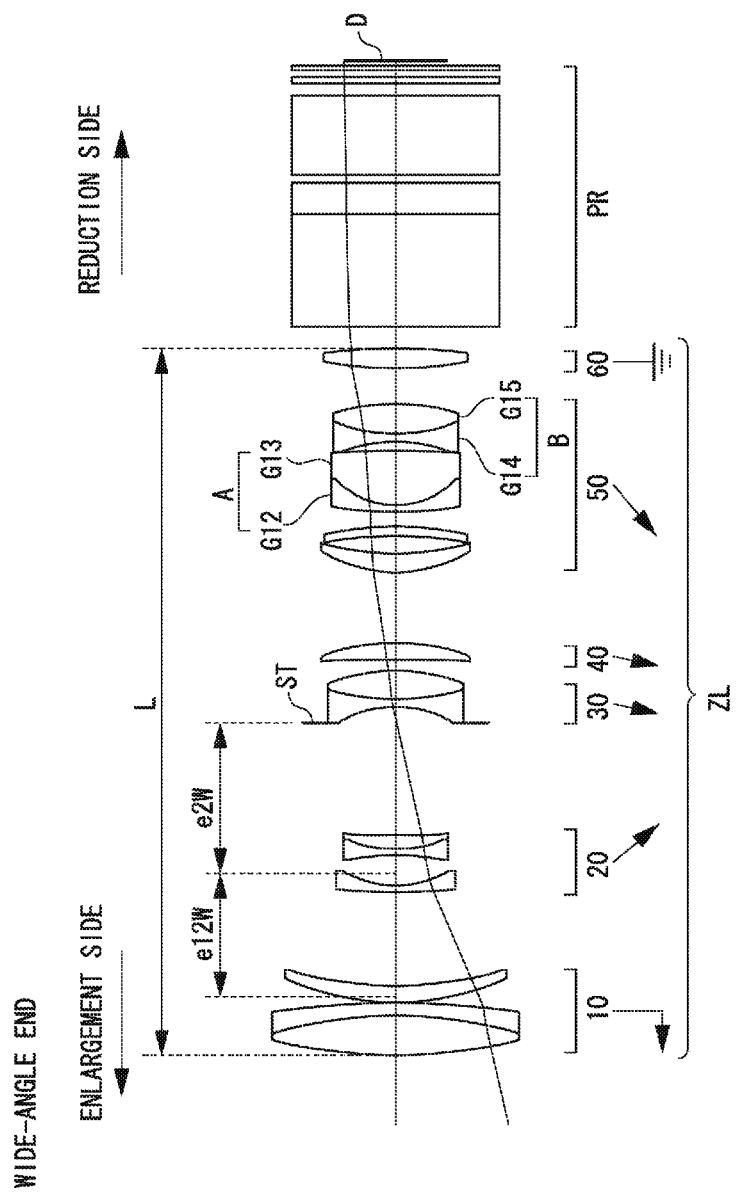

FIGS. 1A and 1B are sectional views of a zoom lens ZL such as a projection lens, a light modulation element D such as a liquid crystal panel, and an optical element PR such as a color combining prism disposed between the zoom lens ZL and the light modulation element D, respectively at the wide-angle end and at the telephoto end according to the first exemplary embodiment of the present invention.

The zoom lens ZL according to the first exemplary embodiment has sixteen lenses in total. The zoom lens ZL, in order from the enlargement side toward the reduction side, includes a first lens unit 10 having positive refractive power, a second lens unit 20 having negative refractive power, a stop ST, a third lens unit 30 having negative refractive power, a fourth lens unit 40 having positive refractive power, a fifth lens unit 50 having positive refractive power, and a sixth lens unit 60 having positive refractive power. Among zooming lens units that move for zooming, a zooming lens unit disposed on the most reduction side is the fifth lens unit, and a final lens group is the sixth lens unit.

The first lens unit 10 and the sixth lens unit 60 do not move (are stationary) for zooming. The first lens unit 10 moves for focusing. The second lens unit 20 moves to the reduction side for zooming from the wide-angle end toward the telephoto end. The third lens unit 30, the fourth lens unit 40, and the fifth lens unit 50 move to the enlargement side for zooming from the wide-angle end toward the telephoto end. Arrows in the lower part of FIG. 1A illustrate loci of movement during zooming from the wide-angle end toward the telephoto end as regards the second lens unit 20, the third lens unit 30, the fourth lens unit 40, and the fifth lens unit 50.

A numerical example 1 of the first exemplary embodiment will be described below. In the table, surface number is a number assigned to each lens surface in order from the enlargement side, "r" represents a curvature radius [mm], d represents a surface distance [mm], "nd" represents a refractive index at the d-line of a lens material, and "vd" represents an Abbe number at the d-line of the lens material.

Figure 2A:
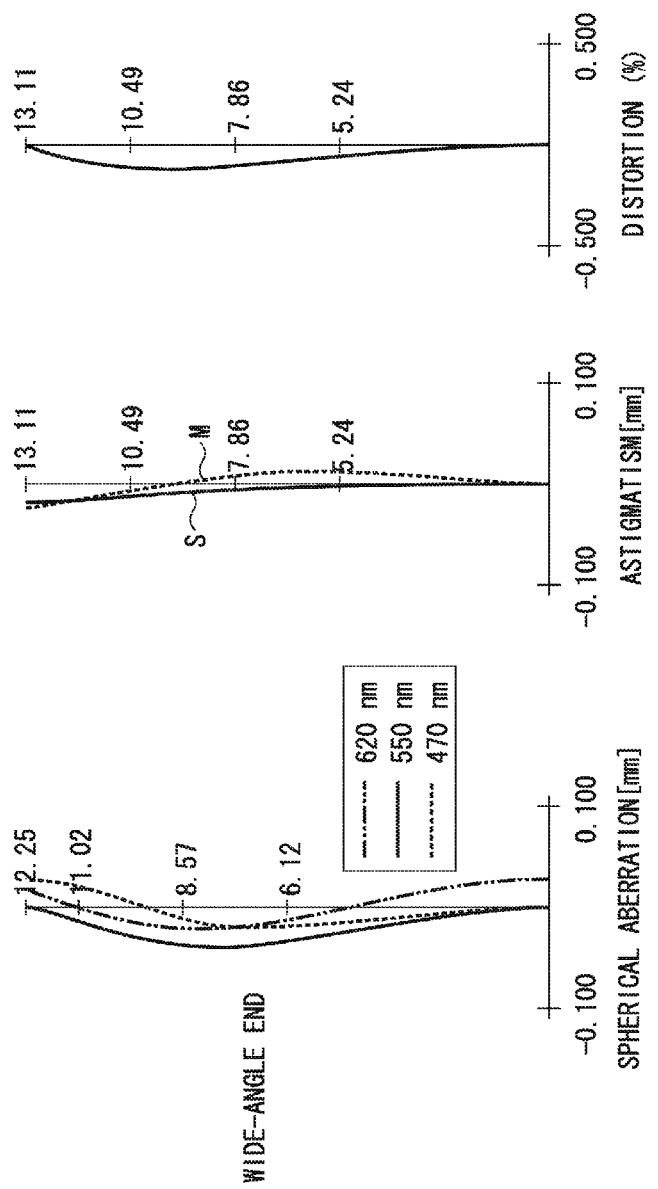
FIGS. 2A and 2B are aberration diagrams of the zoom lens at a wide-angle end and a telephoto end according to a numerical example 1 of the present invention.
Figure 2B:
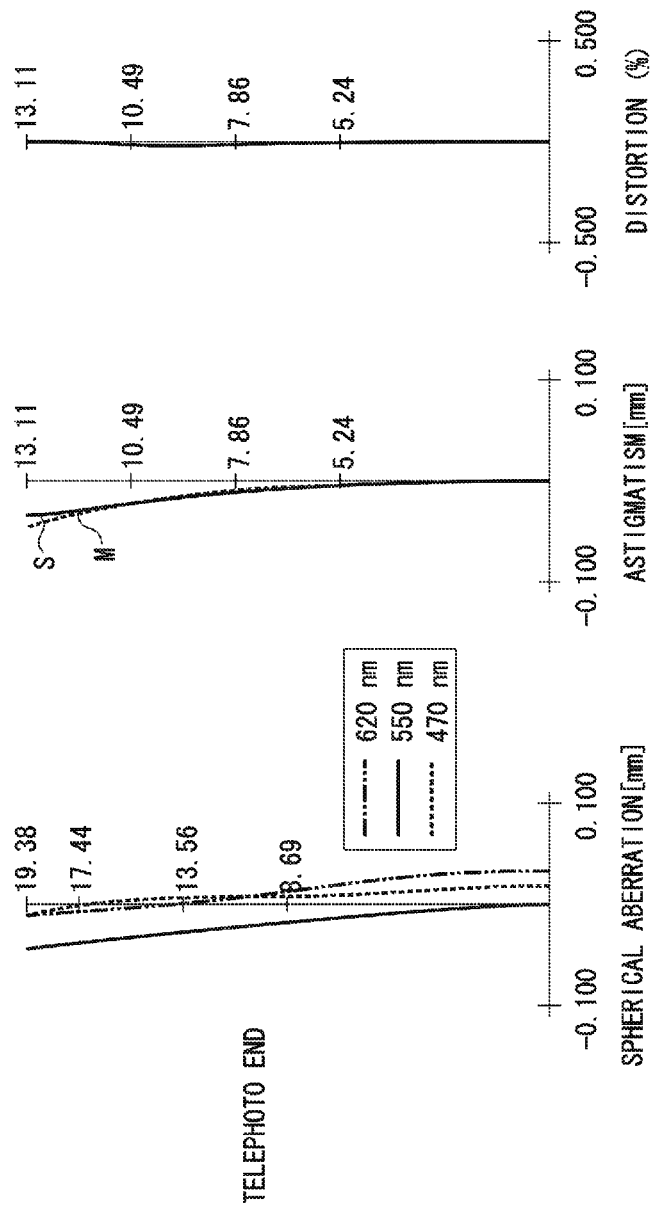

FIGS. 2A and 2B are diagrams illustrating various aberration characteristics of the zoom lens ZL at the wide-angle end and telephoto end when the object distance of the zoom lens ZL is 5.39 m. A dashed line, a solid line, and a two-dot chain line in a spherical aberration diagram in each of FIGS. 2A and 2B indicates spherical aberration for light having a wavelength of 470 [nm], 550 [nm], and 620 [nm], respectively. In an astigmatism diagram in each of FIGS. 2A and 2B, S represented by a solid line indicates astigmatism at a sagittal section, whereas M represented by a dashed line indicates astigmatism at a meridional section.

Figure 3B:
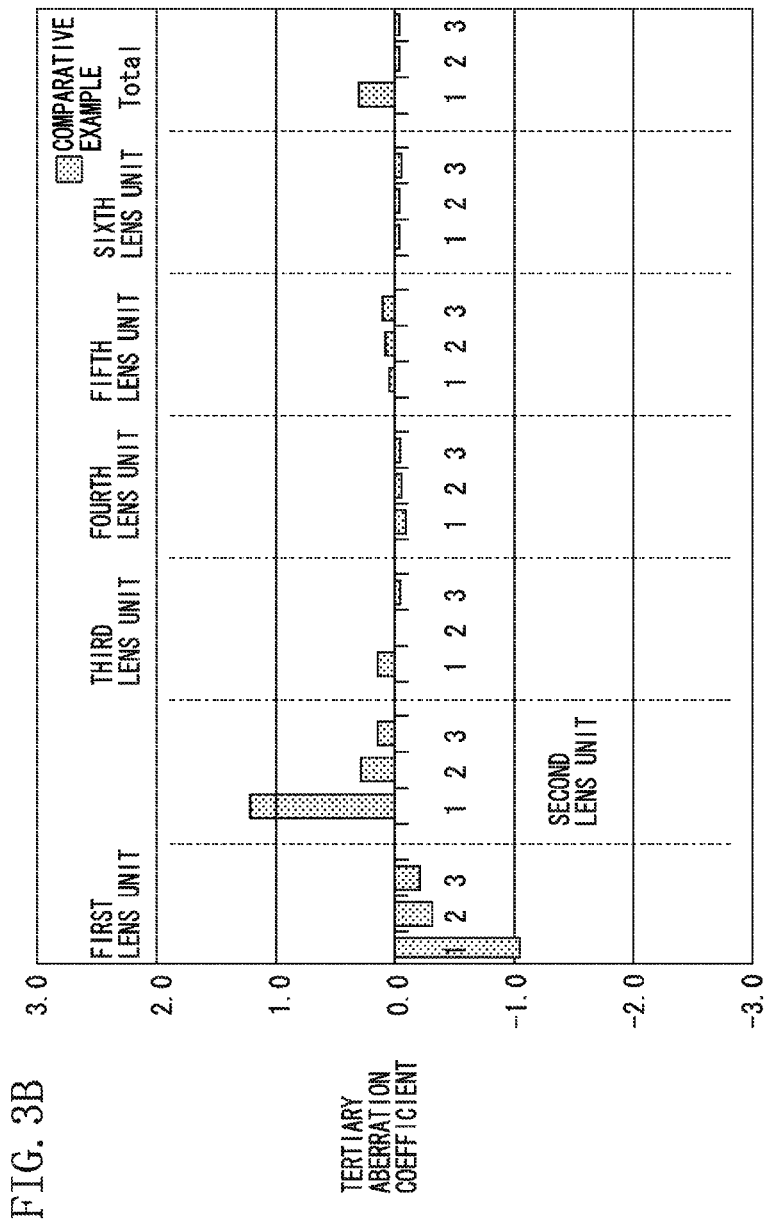

FIG. 3A is a diagram illustrating a distortion coefficient among third-order aberration coefficients of the zoom lens ZL according to the first exemplary embodiment. Numerals 1, 2 and 3 in the center of FIG. 3A represent the wide-angle end, the middle, and the telephoto end, respectively. FIG. 3B is a diagram illustrating a distortion coefficient found by the present inventors by using a numerical example 1 discussed in Japanese Patent Application Laid-Open No. 2003-287680, for the purpose of comparison. "Total" in FIG. 3A and FIG. 3B represents a distortion coefficient of the entire zoom lens. It is appreciated that the zoom lens according to the first exemplary embodiment can suppress the distortion at the wide-angle end without increasing the distortion at the middle and the telephoto end as compared with the comparative example.

Hereafter, optical characteristics in the zoom lens according to the first exemplary embodiment will be described. Optical characteristics of the zoom lens according to second to sixth exemplary embodiments described below are also similar.

In the conventional zoom lens, negative distortion generated in the second lens unit having a high height of the off-axis principal ray from the optical axis and strong negative refractive power is greater than positive distortion generated in the first lens unit having a low height of the off-axis principal ray from the optical axis and weak positive refractive power. As a result, the negative distortion generated in the second lens unit remains as aberration generated in the entire zoom lens. It is considered that consequently correction for the negative distortion at the wide-angle end is not sufficient.

In the zoom lens ZL according to the first exemplary embodiment, therefore, the principal point distance between the first lens unit 10 and the second lens unit 20 at the wide-angle end is made larger as compared with the conventional example, to make the height of the off-axis principal ray from the optical axis large in the principal plane of the first lens unit 10.

In other words, the zoom lens ZL satisfies $$0.15 < e12w/L < 0.25 \quad (1a)$$

where the principal point distance between the first lens unit 10 and the second lens unit 20 at the wide-angle end is denoted by e12w and a distance between a surface vertex of the enlargement side of a lens disposed on the most enlargement side and a surface vertex of the reduction side of a lens disposed on the most reduction side is denoted by L.

It is more desirable to satisfy $$0.18 < e12w/L < 0.22 \quad (1b)$$

instead of (1a).

Hereafter, the distance between the surface vertex of the enlargement side of the lens disposed on the most enlargement side and the surface vertex of the reduction side of the lens disposed on the most reduction side is referred to as a lens configuration length.

If the lower limit value in Condition (1a) is exceeded, then the distance between the principal point of the first lens unit 10 and the principal point of the second lens unit 20 becomes short, resulting in decrease of h_difference (a difference between the height of the off-axis principal ray from the optical axis in the principal plane of the first lens unit 10 and the height of the off-axis principal ray from the optical axis in the principal plane of the second lens unit 20). As a result, the positive distortion generated in the first lens unit 10 at the wide-angle end becomes insufficient to cancel the negative distortion generated in the second lens unit 20.

Meanwhile, if the upper limit value in Condition (1a) is exceeded, then the height of the off-axis principal ray from the optical axis in the principal plane of the first lens unit 10 becomes excessively large and consequently the positive distortion generated in the first lens unit 10 remains at the wide-angle end.

In addition, the zoom lens ZL satisfies $$0.15 < e2w/L < 0.25 \quad (2a)$$

where the principal point distance between the second lens unit 20 and the stop ST at the wide-angle end is denoted by e2w and the lens configuration length is denoted by L.

It is more desirable to satisfy $$0.18 < e2w/L < 0.22 \quad (2b)$$

instead of (2a).

If the lower limit value in Condition (2a) is exceeded, then the second lens unit 20 approaches the stop ST, and consequently the height of the off-axis principal ray that passes through the principal plane of the second lens unit 20 from the optical axis becomes too small. As a result, the negative distortion generated in the second lens unit 20 becomes small as compared with the positive distortion generated in the first lens unit 10. At the wide-angle end, therefore, the distortion generated in the first lens unit 10 remains.

Meanwhile, if the upper limit value in Condition (2a) is exceeded, then the second lens unit 20 goes away from the stop ST, and consequently the height of the off-axis principal ray that passes through the principal plane of the second lens unit 20 from the optical axis becomes too large. As a result, the negative distortion generated in the second lens unit 20 becomes large as compared with the positive distortion generated in the first lens unit 10. At the wide-angle end, therefore, the distortion generated in the second lens unit 20 remains.

According to the present exemplary embodiment of the present invention, the positive distortion which is larger as compared with the conventional art can be generated in the first lens unit 10 by satisfying Condition (1a) and Condition (2a). As a result, it is possible to cancel the negative distortion generated in the second lens unit 20. In other words, the present exemplary embodiment of the present invention implements favorable correction of distortion at the wide-angle end by adopting a configuration in which the positive distortion generated in the first lens unit 10 and the negative distortion generated in the second lens unit 20 can balance each other.

Subsequently, a configuration for maintaining, at the telephoto end as well, the sufficient balance of distortion correction obtained at the wide-angle end will be described.

To sufficiently reduce the distortion at the telephoto end as well, it is desirable that the zoom lens ZL satisfies $$0.25 < e12t/L < 0.40 \quad (3a)$$

where the principal point distance between the first lens unit 10 and the second lens unit 20 at the telephoto end is denoted by e12t and the lens configuration length is denoted by L.

It is more desirable to satisfy $$0.30 < e12t/L < 0.35 \quad (3b)$$

instead of (3a).

If the lower limit value in Condition (3a) is exceeded, then the first lens unit 10 approaches the second lens unit 20, and consequently the h_difference reduces. As a result, the positive distortion generated in the first lens unit 10 at the telephoto end becomes insufficient to cancel the negative distortion generated in the second lens unit 20.

Meanwhile, if the upper limit value in Condition (3a) is exceeded, then the height of the off-axis principal ray that passes through the first lens unit 10 from the optical axis becomes excessively large. At the telephoto end, therefore, the positive distortion generated in the first lens unit 10 remains.

In addition, the zoom lens ZL satisfies $$0.03 < e2t/L < 0.11 \quad (4a)$$

where the principal point distance between the second lens unit 20 and the stop ST at the telephoto end is denoted by e2t and the lens configuration length is denoted by L.

It is more desirable to satisfy $$0.05 < e2t/L < 0.09 \quad (4b)$$

instead of (4a).

If the lower limit value in Condition (4a) is exceeded, then the second lens unit 20 approaches the stop ST, and consequently the height of the off-axis principal ray that passes through the second lens unit 20 from the optical axis becomes too small. As a result, the negative distortion generated in the second lens unit 20 becomes small as compared with the positive distortion generated in the first lens unit 10. At the telephoto end, therefore, the distortion generated in the first lens unit 10 remains.

Meanwhile, if the upper limit value in Condition (4a) is exceeded, then the second lens unit 20 goes away from the stop ST, and consequently the height of the off-axis principal ray that passes through the second lens unit 20 from the optical axis becomes too large. As a result, the negative distortion generated in the second lens unit 20 becomes large as compared with the positive distortion generated in the first lens unit 10. At the telephoto end, therefore, the distortion generated in the second lens unit 20 remains.

The zoom lens ZL according to the present exemplary embodiment of the present invention can obtain a correction result of distortion to some degree at the telephoto end in addition to the correction result of distortion at the wide-angle end by satisfying Conditions (1a) to (4a).

Incidentally, the distance e12w between the principal point of the first lens unit and the principal point of the second lens unit at the wide-angle end is a distance between a principal point of the first lens unit on the reduction conjugation side (light modulation element side, the second lens unit side) and a principal point of the second lens unit on the enlargement conjugation side (projected surface side, the first lens unit side). As for other distances between principal points as well, the distance is a distance between a principal point of one lens unit on the other lens unit (or the stop) side and a principal point (or the position of the stop) of the other lens unit on the one lens unit side. The same holds true for the telephoto end as well. Furthermore, the distance e2w between the principal point of the second lens unit and the stop at the wide-angle end (or the telephoto end) is a distance between a principal point of the second lens unit on the stop side (reduction conjugation side) and the stop at the wide-angle end (or the telephoto end).

During zooming of the zoom lens ZL from the wide-angle end to the telephoto end, however, the second lens unit 20 moves to the reduction side whereas the first lens unit 10 is stationary (not moving). The change of the generation amount of the distortion in the second lens unit 20 is large as compared with the first lens unit 10. As a result, it is difficult to maintain the balance in distortion between the first lens unit 10 and the second lens unit 20 favorably at the telephoto end only according to the Conditions (1a) to (4a).

Therefore, the zoom lens ZL according to the present exemplary embodiment of the present invention has the following configuration to maintain at the telephoto end as well the balance in distortion between the first lens unit 10 and the second lens unit 20 at the wide-angle end. That is, unlike the conventional zoom lens, much of distortion in the entire zoom lens is not reduced at the telephoto end by the mutual cancel action in distortion between the first lens unit 10 and the second lens unit 20. In the zoom lens according to the present exemplary embodiment of the present invention, zooming lens units located on the reduction side as compared with the stop, among lens units moving during zooming, correct the change of the distortion value generated in the first lens unit 10 and the second lens unit 20 during zooming. As a result, it becomes possible to reduce the distortion of the entire zoom lens at the telephoto end as well.

Specifically, the fifth lens unit 50 having positive refractive power includes a cemented lens A having a negative lens G12 and a positive lens G13, and a cemented lens B having a negative lens G14 and a positive lens G15, in order from the enlargement side toward the reduction side. In addition, cemented surfaces of the cemented lens A and the cemented lens B have a convex shape on the enlargement side. Although the fifth lens unit 50 has positive refractive power, this configuration generates distortion corresponding to a negative lens. In addition, the cemented lens A satisfies $$0.15 < Nn - Np < 0.35 \tag{5a}$$

where the refractive index of the negative lens included in the cemented lens A is denoted by Nn and the refractive index of the lens having positive refractive power is denoted by Np.

It is more desirable to satisfy $$0.19 < Nn - Np < 0.32 \tag{5b}$$

instead of (5a).

If the lower limit value in Condition (5a) is exceeded, the positive refractive power in the cemented lens becomes strong and the negative distortion generated in the fifth lens unit 50 becomes weak. As a result, correction of the distortion becomes difficult.

Meanwhile, if the upper limit value in Condition (5a) is exceeded, the negative refractive power in the cemented lens becomes strong and the negative distortion generated in the fifth lens unit 50 becomes excessive. As a result, negative distortion remains in the entire zoom lens.

In the first exemplary embodiment, the fifth lens unit 50 includes the two cemented lenses A and B. However, as long as a positive lens and a negative lens satisfying Condition (5a) are cemented and the cemented surface has a convex shape on the enlargement side, it is possible to obtain the effect of the present exemplary embodiment of the present invention even if the fifth lens unit has only one cemented lens.

During zooming from the wide-angle end to the telescope end, the fifth lens unit 50 including the cemented lens satisfying Condition (5a) is moved to the enlargement side, which is opposite to a movement direction of the second lens unit 20.

Since the second lens unit 20 moves to the reduction side during zooming, the height of the off-axis principal ray that passes through the second lens unit 20 from the optical axis becomes low. Meanwhile, since the fifth lens unit 50 having the same negative distortion as the second lens unit 20 moves to the enlargement side during zooming, the height of off-axis principal ray that passes through the fifth lens unit 50 from the optical axis becomes low. As a result, it becomes possible to cancel a change of generation amount of distortion generated in the second lens unit 20 with a change of generation amount of distortion generated in the fifth lens unit 50.

The zoom lens according to the present exemplary embodiment of the present invention described above can favorably correct negative distortion viewed in the positive lead type, in the whole zoom area. Furthermore, as another effect of the present exemplary embodiment of the present invention, it is possible to mention a point that generation of aberration other than the distortion is also favorably corrected in the whole zoom area.

Hereafter, a more preferable exemplary embodiment will be described.

It is more desirable to satisfy $$1.10 < f1/\sqrt{(fw*ft)} < 2.20 \tag{6a}$$

$$-0.75 < f2/\sqrt{(fw*ft)} < -0.30 \tag{7a}$$

where a focal length of the first lens unit 10 by f1, a focal length of the second lens unit 20 is denoted by f2, a focal length of the entire zoom lens at the wide-angle end is denoted by fw, and a focal length of the entire zoom lens at the telephoto end is denoted by ft.

It is more desirable to satisfy $$1.40 < f1/\sqrt{(fw*ft)} < 2.10 \tag{6b}$$

$$-0.60 < f2/\sqrt{(fw*ft)} < -0.50 \tag{7b}$$

instead of Conditions (6a) and (7a).

If the lower limit value in Condition (6a) is exceeded, the focal length of the first lens unit 10 becomes short. As a result, positive distortion generated in the first lens unit 10 remarkably exceeds negative distortion generated in the second lens unit 20, and the positive distortion generated in the first lens unit 10 remains at the wide-angle end.

Meanwhile, if the upper value in Condition (6a) is exceeded, the focal length of the first lens unit 10 becomes long. This poses a problem that the diameter (front lens diameter) of a lens disposed on the most enlargement side becomes large.

If the lower limit value in Condition (7a) is exceeded, the focal length of the second lens unit 20 becomes long. As a result, the negative distortion generated in the second lens unit 20 becomes relatively small as compared with the positive distortion generated in the first lens unit 10, and the distortion of the first lens unit 10 remains at the wide-angle end.

Meanwhile, if the upper limit value in Condition (7a) is exceeded, the negative distortion generated in the second lens unit 20 becomes relatively large, and the distortion of the second lens unit remains at the wide-angle end.

It is more desirable to satisfy $$0.09 < X2/L < 0.18 \tag{8a}$$

$$0.08 < Xh/L < 0.14 \tag{9a}$$

where an amount of movement of the second lens unit 20 from the wide-angle end to the telephoto end is denoted by X2 and an amount of movement of the fifth lens unit 50 from the wide-angle end to the telephoto end is denoted by Xh.

It is more desirable to satisfy $$0.10 < X2/L < 0.16 \tag{8b}$$

$$0.09 < Xh/L < 0.13 \tag{9b}$$

instead of Conditions (8a) and (9a).

If the lower limit value in Condition (8a) is exceeded, the amount of movement of the second lens unit 20 during zooming becomes too short, and it is disadvantageous not only to distortion correction but also to correction of various aberrations during zooming.

Meanwhile, if the upper limit value in Condition (8a) is exceeded, the amount of movement of the second lens unit 20 becomes too long. As a result, the front lens diameter and the lens configuration length in the optical axis direction become large. In addition, a distortion change amount is generated excessively and distortion correction in the entire zoom lens becomes difficult.

If the lower limit value in Condition (9a) is exceeded, the amount of movement of the fifth lens unit 50 becomes too short, and positive distortion in the sixth lens unit 60 is generated excessively. As a result, positive distortion remains in the entire zoom lens, and it becomes disadvantageous to correct other aberrations as well.

Meanwhile, if the upper limit value in Condition (9a) is exceeded, the amount of movement of the fifth lens unit 50 becomes long, resulting in prolonged lens configuration length in the optical axis direction. In addition, a distortion change amount in the fifth lens unit 50 during zooming becomes excessive and distortion correction in the entire zoom lens becomes difficult.

It is more desirable to satisfy $$2.25 < fh/\sqrt{(fw \ast ft)} < 5.00 \qquad (10a)$$

$$0.90 < fL/\sqrt{(fw \ast ft)} < 1.20 \qquad (11a)$$

where a focal length of the fifth lens unit 50 is denoted by fh and a focal length of the sixth lens unit 60 is denoted by fL.

It is more desirable to satisfy $$3.00 < fh/\sqrt{(fw \ast ft)} < 4.50 \qquad (10b)$$

$$0.90 < fL/\sqrt{(fw \ast ft)} < 1.10 \qquad (11b)$$

instead of (10a) and (11a).

If the lower limit value in Condition (10a) is exceeded, the focal length of the fifth lens unit 50 becomes short, and negative distortion in the fifth lens unit 50 is generated excessively. As a result, negative distortion remains in the entire zoom lens. Furthermore, various aberrations generated in the fifth lens unit 50 increase.

Meanwhile, if the upper limit value in Condition (10a) is exceeded, the focal length of the fifth lens unit 50 becomes long, resulting in larger lens diameters in the fifth lens unit 50.

If the lower limit value in Condition (11a) is exceeded, the focal length of the sixth lens unit 60 becomes short, and positive distortion in the sixth lens unit 60 occurs excessively. As a result, positive distortion remains in the entire zoom lens.

Meanwhile, if the upper limit value in Condition (11a) is exceeded, the focal length of the sixth lens unit 60 becomes long, resulting in larger lens diameters in the sixth lens unit 60.

As described above, it is possible to more favorably reduce the distortion in the entire zoom lens at the telephoto end as well by correcting distortion not only in the fifth lens unit 50 but also in the sixth lens unit 60 which is the final lens unit and stationary (not moving) for zooming.

In addition, owing to satisfaction of Conditions (6a) and (11a) respectively by the first lens unit 10 and the sixth lens unit 60, it becomes possible to cancel distortions each other. Furthermore, since both the first lens unit 10 and the sixth lens unit 60 are stationary (not moving) during zooming, the change of height of the off-axis principal ray from the optical axis during zooming is small. As a result, it is possible to obtain the distortion cancel action at both the wide-angle end and the telephoto end.

In addition, it is more desirable to dispose the sixth lens unit 60 in a position nearly symmetrical to that of the first lens unit 10 having positive refractive power about the stop. It is possible to obtain the effect much more by doing so.

In addition, the zoom lens ZL satisfies $$0.01 < ehw/L < 0.30 \qquad (12a)$$

where a distance between the principal point of the stop ST and a principal point of the fifth lens unit 50 is denoted by ehw at the wide-angle end.

It is more desirable to satisfy $$0.04 < ehw/L < 0.29 \qquad (12b)$$

instead of (12a)

If the lower limit value in Condition (12a) is exceeded, then the fifth lens unit 50 approaches the stop ST, and consequently the height of the off-axis principal ray from the optical axis decreases. As a result, the negative distortion generated in the fifth lens unit 50 becomes small at the wide-angle end. At the wide-angle end, therefore, positive distortion remains.

Meanwhile, if the upper limit value in Condition (12a) is exceeded, then the whole length in the optical axis direction becomes long and in addition the height of the off-axis principal ray of the fifth lens unit 50 from the optical axis becomes excessively large. As a result, negative distortion at the wide-angle end becomes conspicuous.

In addition, the zoom lens ZL satisfies $$0.25 < elw/L < 0.45 \qquad (13a)$$

where a principal point distance between the stop ST and the sixth lens unit 60 at the wide-angle end is denoted by elw.

It is more desirable to satisfy $$0.25 < elw/L < 0.40 \qquad (13b)$$

instead of (13a).

If the lower limit value in Condition (13a) is exceeded, then the height of the off-axis principal ray of the sixth lens unit 60 from the optical axis decreases. As a result, the positive distortion of the sixth lens unit 60 generated at the wide-angle end becomes small. At the wide-angle end, therefore, negative distortion remains.

Meanwhile, if the upper limit value in Condition (13a) is exceeded, then the whole length in the optical axis direction becomes long and in addition the height of the off-axis principal ray of the sixth lens unit 60 from the optical axis becomes excessively large. As a result, positive distortion at the wide-angle end becomes conspicuous.

In addition, the zoom lens ZL satisfies $$0.04 < eht/L < 0.40 \qquad (14a)$$

where a distance between the principal point of the stop ST and the principal point of the fifth lens unit 50 at the telephoto end is denoted by eht.

It is more desirable to satisfy $$0.13 < eht/L < 0.39 \qquad (14b)$$

instead of (14a).

If the lower limit value in Condition (14a) is exceeded, then the height of the off-axis principal ray of the fifth lens unit 50 from the optical axis decreases. As a result, the negative distortion of the fifth lens unit 50 at the telephoto end becomes small. At the telephoto end, therefore, positive distortion remains.

Meanwhile, if the upper limit value in Condition (14a) is exceeded, the height of the off-axis principal ray of the fifth lens unit 50 from the optical axis becomes excessively large. As a result, the system size in the optical axis direction becomes large, and in addition negative distortion generated in the fifth lens unit 50 remains at the telephoto end.

In addition, the zoom lens ZL satisfies $$0.25 < elt/L < 0.50 \qquad (15a)$$

where the principal point distance between the stop ST and the sixth lens unit 60 at the telephoto end is denoted by elt.

It is more desirable to satisfy $$0.25 < elt/L < 0.45 \qquad (15b)$$

instead of (15a).

If the lower limit value in Condition (15a) is exceeded, then the height of the off-axis principal ray of the sixth lens unit 60 from the optical axis decreases. As a result, the positive distortion of the sixth lens unit 60 at the telephoto end becomes small. At the telephoto end, therefore, negative distortion remains.

Meanwhile, if the upper limit value in Condition (15a) is exceeded, the size of the entire zoom lens in the optical axis direction becomes large, and in addition positive distortion generated in the sixth lens unit 60 remains at the telephoto end.

As described above, more favorable reduction of distortion over the whole area of zooming becomes possible by adopting a configuration that satisfies at least any one of Conditions (6a) to (15a) besides Conditions (1a) to (5a) at the wide-angle end and the telephoto end.

Furthermore, as other effects, it is possible to secure a long back focus required for application to projectors and secure a telecentric ray.

Furthermore, the stop ST is not restricted to a light blocking plate having an aperture. If a holding portion which holds a lens functions as a stop, the stop ST may be a lens holding portion. If the lens itself functions as a stop, the stop ST is an outer edge of the lens.

Incidentally, the zoom lens according to the present exemplary embodiment of the present invention is suitable especially for the projection lens of the projector. Therefore, the distance between lens units at the wide-angle end, middle, and telephoto end according to each of the numerical examples indicates a numerical value when moving the focus lens to make the diagonal length of the projected image constant and changing the projection distance d0.

Numerical Example 1

| Unit mm | | | | |
|---|---|---|---|---|
| Surface data | | | | |
| Surface number | r | d | nd | vd |
| OBJ | ∞ | d0 | | |
| 1 | 123.308 | 9.85 | 1.487 | 70.2 |
| 2 | −106.082 | 3.16 | 1.720 | 46.0 |
| 3 | −188.372 | 0.22 | | |
| 4 | 65.115 | 4.05 | 1.516 | 64.1 |
| 5 | 90.459 | d5 | | |
| 6 | 238.217 | 1.65 | 1.603 | 60.6 |
| 7 | 26.675 | 7.52 | | |
| 8 | −60.008 | 1.40 | 1.516 | 64.1 |
| 9 | 30.708 | 3.40 | 1.799 | 42.2 |
| 10 | 207.738 | d10 | | |
| 11 (Stop) | 0.000 | 3.83 | | |
| 12 | −25.981 | 1.83 | 1.698 | 30.1 |
| 13 | 56.193 | 7.10 | 1.696 | 55.5 |
| 14 | −46.339 | d14 | | |
| 15 | −479.991 | 4.05 | 1.808 | 22.7 |
| 16 | −53.463 | d16 | | |
| 17 | 33.545 | 4.75 | 1.808 | 22.7 |
| 18 | 63.732 | 4.19 | | |
| 19 | −119.184 | 2.53 | 1.516 | 64.1 |
| 20 | −82.120 | 3.54 | | |
| 21 | 92.619 | 1.72 | 1.805 | 25.4 |
| 22 | 20.404 | 13.75 | 1.603 | 60.6 |
| 23 | −116.593 | 2.03 | | |
| 24 | −38.474 | 1.95 | 1.806 | 33.3 |
| 25 | 38.482 | 7.35 | 1.516 | 64.1 |
| 26 | −56.368 | d26 | | |
| 27 | 88.275 | 5.05 | 1.805 | 25.4 |
| 28 | −167.93 | 3.94 | | |
| 29 | ∞ | 1.50 | | |
| 30 | ∞ | 28.00 | 1.516 | 64.1 |
| 31 | ∞ | 7.82 | 1.516 | 64.1 |
| 32 | ∞ | 2.04 | | |
| 33 | ∞ | 19.50 | 1.805 | 25.4 |
| 34 | ∞ | 3.10 | | |
| 35 | ∞ | 1.32 | 1.516 | 64.1 |
| 36 | ∞ | 2.08 | | |
| 37 | ∞ | 0.70 | 1.516 | 64.1 |
| 38 | ∞ | 1.24 | | |

| Various data | | | |
|---|---|---|---|
| Zoom ratio 1.97093 | | | |
| | Wide-angle end | Middle | Telephoto end |
| Focal length | 53.5995 | 75.2824 | 105.6409 |
| F-number | 2.28000 | 2.80000 | 3.10000 |
| Viewing angle | 27.4885 | 19.7573 | 14.1484 |
| Image height | 13.1100 | 13.1100 | 13.1100 |
| Lens configuration length | 175.678 | 174.557 | 174.180 |
| BF | 71.2418 | 71.2258 | 71.2418 |
| Distance change during zooming | | | |
| d0 | 5390.00 | 8460.00 | 10500.00 |
| d5 | 23.38 | 35.23 | 45.63 |
| d10 | 28.13 | 15.01 | 3.65 |
| d14 | 2.77 | 2.83 | 1.26 |
| d16 | 17.63 | 8.78 | 1.59 |
| d26 | 8.83 | 17.77 | 27.13 |

Figure 4A:
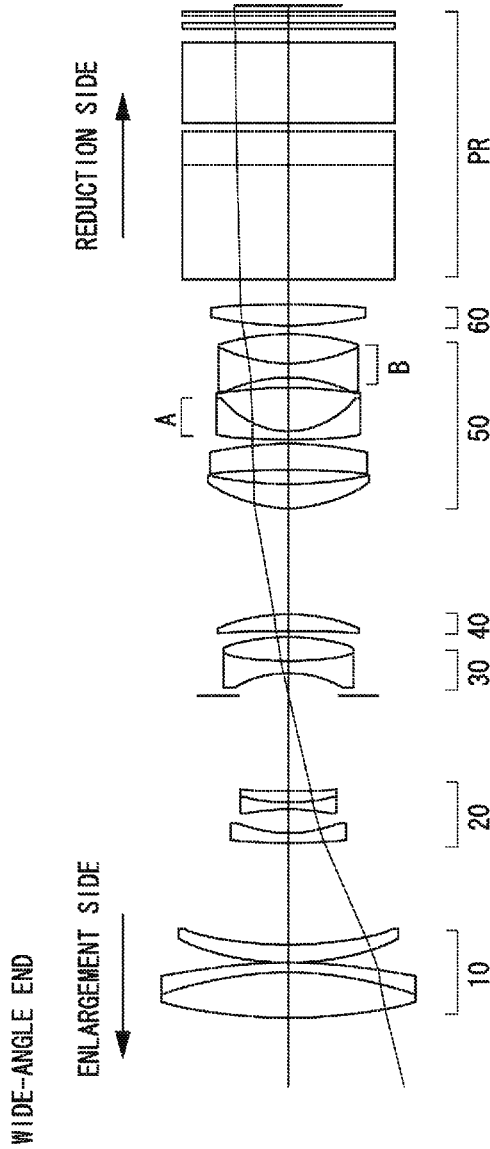
FIGS. 4A and 4B are sectional views of a zoom lens and an optical element disposed between the zoom lens and a light modulation element according to a second exemplary embodiment of the present invention.
Figure 4B:
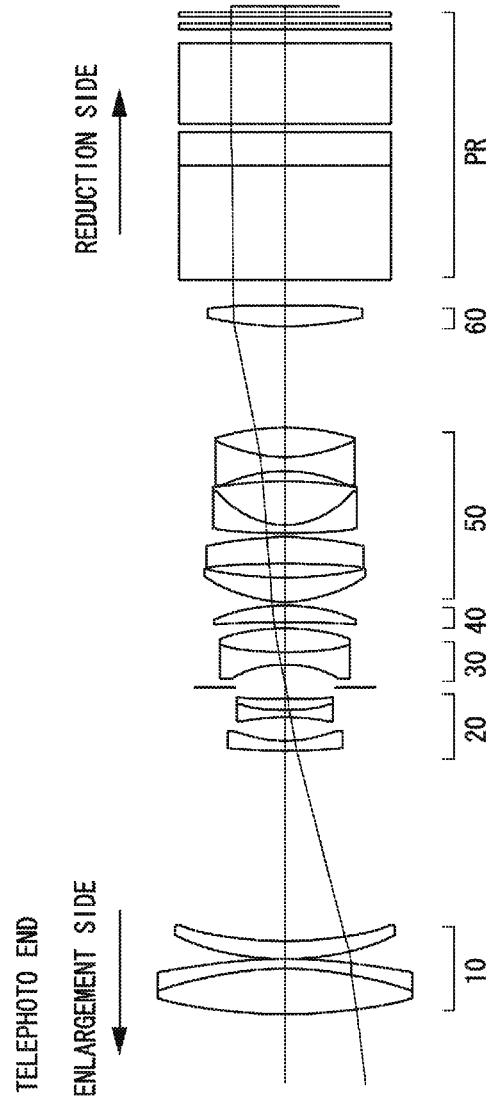
Figure 5A:
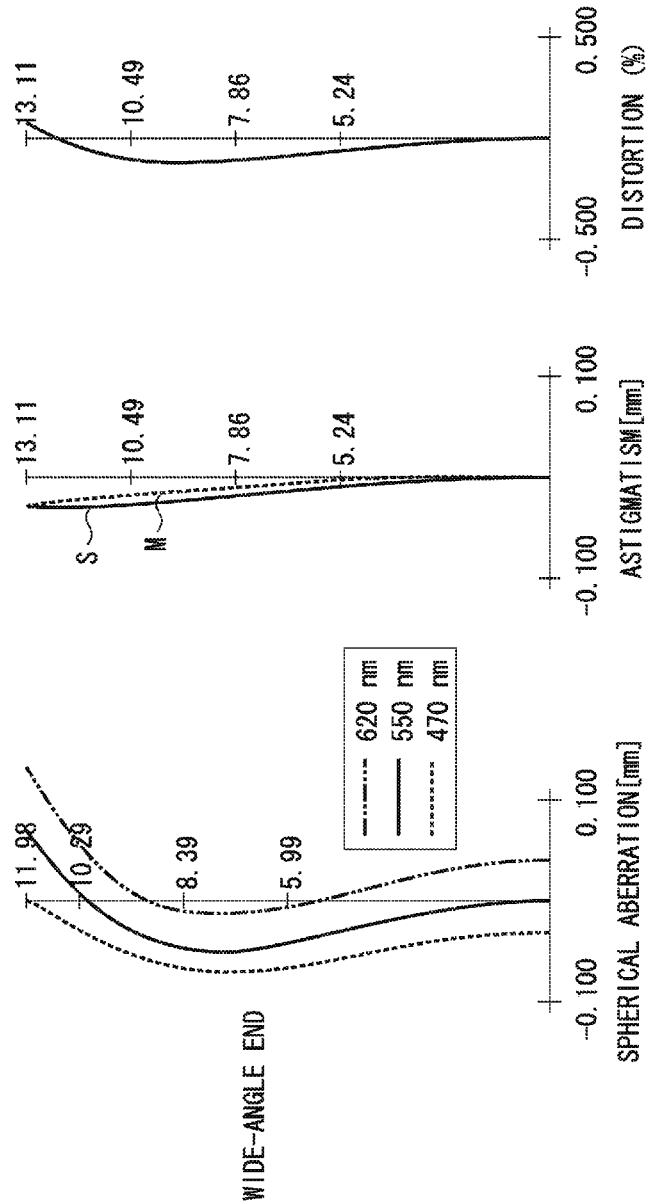
FIGS. 5A and 5B are aberration diagrams of the zoom lens at a wide-angle end and a telephoto end according to a numerical example 2 of the present invention.
Figure 5B:
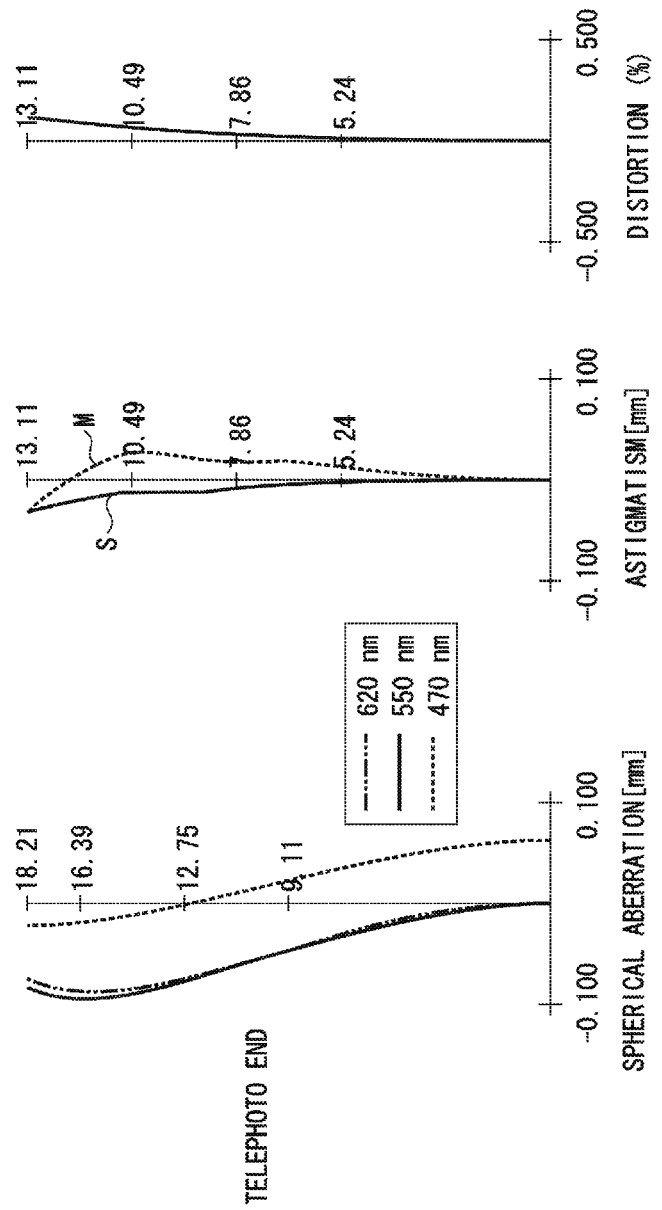

FIGS. 4A and 4B illustrate sectional views of a zoom lens, and an optical element disposed between the zoom lens and a light modulation element according to a second exemplary embodiment of the present invention. A numerical example 2 of the second exemplary embodiment is illustrated below. FIGS. 5A and 5B illustrate various aberration diagrams of the numerical example 2. The zoom lens according to the second exemplary embodiment also satisfies Conditions (1a) to (15a).

The second exemplary embodiment differs from the first exemplary embodiment in that the principal point distance between the first lens unit 10 and the second lens unit 20 is widened and the principal point distance between the second lens unit 20 and the stop ST is narrowed at the wide-angle end. In addition, the second exemplary embodiment obtains the effect of distortion correction at the wide-angle end similar to the first exemplary embodiment by weakening the refractive power of the first lens unit 10 for the second lens unit 20 by an amount of the balance change of the principal point distance.

Furthermore, the second exemplary embodiment also differs from the first exemplary embodiment in that the principal point distance between the stop ST and the fifth lens unit 50 disposed on the most reduction side is shortened. The second exemplary embodiment obtains the effect of distortion correction at the telephoto end similar to the first exemplary embodiment by relatively strengthening the refractive power of the fifth lens unit 50 as compared with refractive power of other lens units by an amount corresponding to the change of the principal point distance between the stop ST and the fifth lens unit 50 disposed on the most reduction side. In other words, in the second exemplary embodiment as well, it is possible to obtain the same effects as those in the first exemplary embodiment.

Numerical Example 2

|  | r | d | nd | vd |
|---|---|---|---|---|
| OBJ | ∞ | d0 | | |
| 1 | 137.355 | 10.87 | 1.487 | 70.2 |
| 2 | −85.487 | 2.39 | 1.717 | 47.9 |
| 3 | −146.952 | 0.27 | | |
| 4 | 66.896 | 3.94 | 1.516 | 64.1 |
| 5 | 90.039 | d5 | | |
| 6 | 239.836 | 2.38 | 1.603 | 60.6 |
| 7 | 35.833 | 5.69 | | |
| 8 | −61.996 | 1.56 | 1.516 | 64.1 |
| 9 | 39.490 | 2.84 | 1.786 | 44.2 |
| 10 | 87.643 | d10 | | |
| 11 Stop | ∞ | 5.84 | | |
| 12 | −24.461 | 2.52 | 1.699 | 30.1 |
| 13 | 67.213 | 6.31 | 1.713 | 53.9 |
| 14 | −43.675 | d14 | | |
| 15 | −261.846 | 3.87 | 1.808 | 22.8 |
| 16 | −50.145 | d16 | | |
| 17 | 33.034 | 5.96 | 1.808 | 22.8 |
| 18 | 86.920 | 3.48 | | |
| 19 | −140.997 | 6.22 | 1.516 | 64.1 |
| 20 | −82.169 | 1.08 | | |
| 21 | 144.726 | 1.74 | 1.805 | 25.4 |
| 22 | 19.564 | 10.83 | 1.603 | 60.6 |
| 23 | −91.989 | 2.33 | | |
| 24 | −36.171 | 3.36 | 1.806 | 33.3 |
| 25 | 35.264 | 7.14 | 1.516 | 64.1 |
| 26 | −55.492 | d26 | | |
| 27 | 74.880 | 5.30 | 1.805 | 25.4 |
| 28 | −223.659 | 4.41 | | |
| 29 | ∞ | 1.50 | | |
| 30 | ∞ | 28.00 | 1.516 | 64.1 |
| 31 | ∞ | 7.82 | 1.516 | 64.1 |
| 32 | ∞ | 2.04 | | |
| 33 | ∞ | 19.50 | 1.805 | 25.4 |
| 34 | ∞ | 3.10 | | |
| 35 | ∞ | 1.32 | 1.516 | 64.1 |
| 36 | ∞ | 2.08 | | |
| 37 | ∞ | 0.70 | 1.516 | 64.1 |
| 38 | ∞ | 1.24 | | |

Various data
Zoom ratio 1.97127

|  | Wide-angle end | Middle | Telephoto end |
|---|---|---|---|
| Focal length | 53.6041 | 76.2651 | 105.668 |
| F-number | 2.33000 | 2.80000 | 3.10000 |
| Viewing angle | 27.4862 | 19.5077 | 14.1448 |
| Image height | 13.1100 | 13.1100 | 13.1100 |
| Lens configuration length | 172.546 | 171.402 | 171.016 |
| BF | 71.7240 | 71.7240 | 71.7240 |
| Distance during zooming | | | |
| d0 | 5390.00 | 8460.00 | 10500.00 |
| d5 | 24.81 | 35.93 | 46.06 |
| d10 | 22.82 | 11.24 | 3.08 |
| d14 | 1.24 | 1.91 | 0.72 |
| d16 | 25.84 | 11.77 | 1.03 |
| d26 | 1.89 | 14.60 | 24.18 |

Figure 6A:
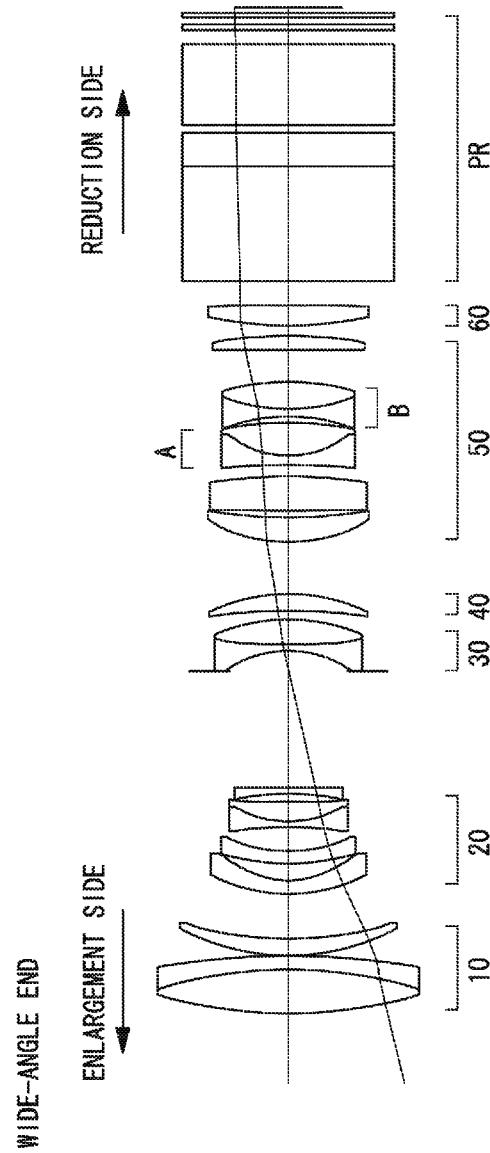
FIGS. 6A and 6B are sectional views of a zoom lens and an optical element disposed between the zoom lens and a light modulation element according to a third exemplary embodiment of the present invention.
Figure 6B:
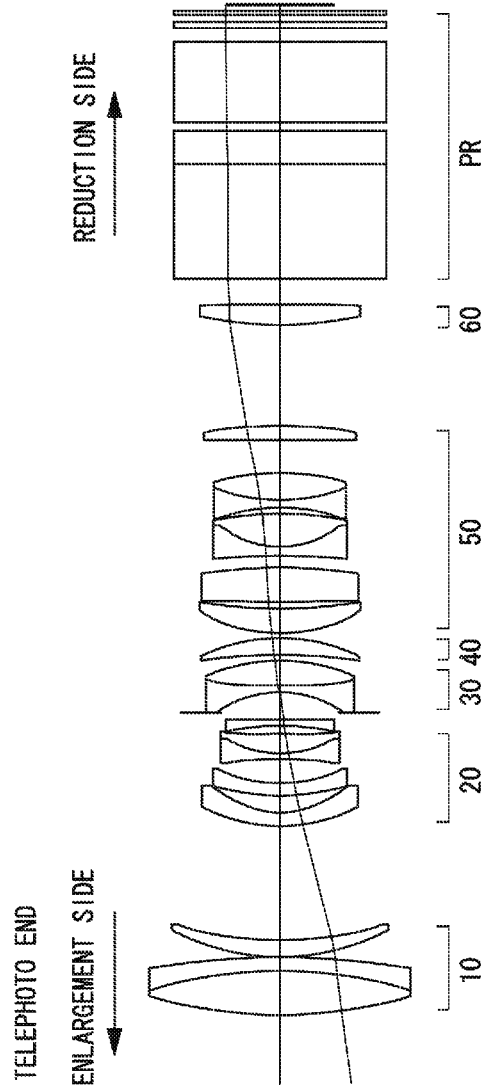
Figure 7A:
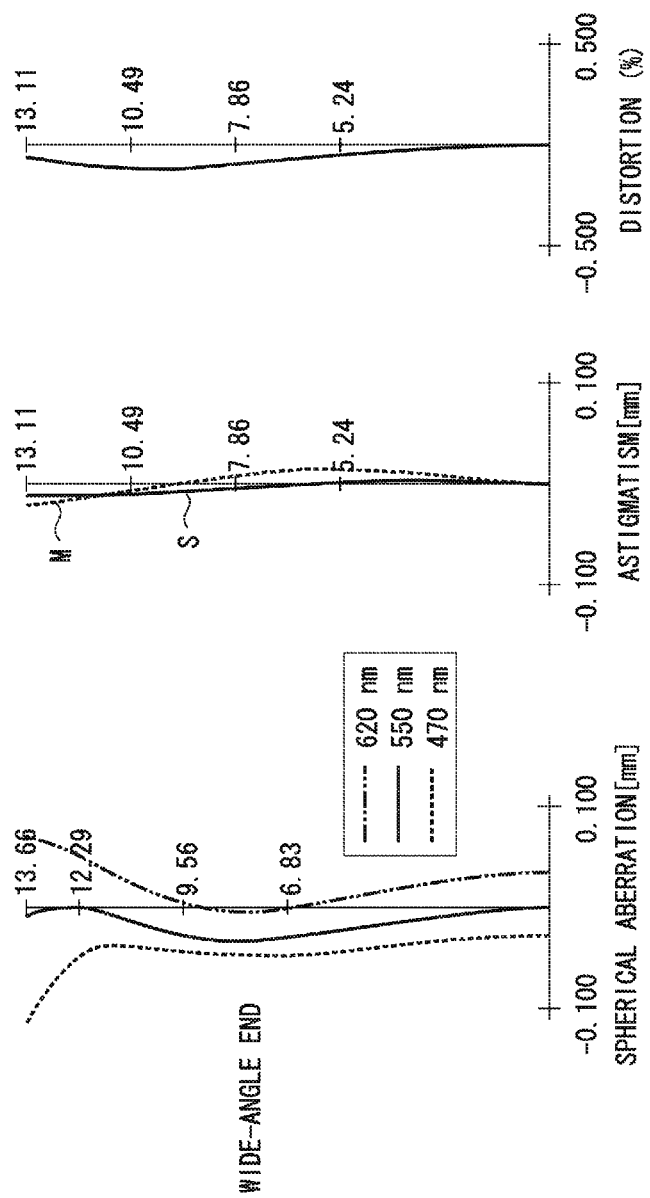

FIGS. 6A and 6B illustrate sectional views of a zoom lens, and an optical element disposed between the zoom lens and a light modulation element according to a third exemplary embodiment of the present invention. A numerical example 3 of the third exemplary embodiment is illustrated below. FIGS. 7A and 7B illustrate various aberration diagrams of the numerical example 3. The zoom lens according to the third exemplary embodiment also satisfies Conditions (1a) to (15a).

The third exemplary embodiment is a design example directed to securement of brighter F-number as compared with the first and second exemplary embodiments. The third exemplary embodiment differs from the first and second exemplary embodiments in that the number of lenses included in the fifth lens unit 50 is increased by three to implement the distortion correction while securing bright F-number. As a result, it is possible to obtain the same effects as those in the first exemplary embodiment while making F-number brighter.

Numerical Example 3

|  | r | d | nd | vd |
|---|---|---|---|---|
| OBJ | ∞ | d0 | | |
| 1 | 112.357 | 10.72 | 1.487 | 70.2 |
| 2 | −104.562 | 3.23 | 1.723 | 37.9 |
| 3 | −184.573 | 0.29 | | |
| 4 | 56.801 | 4.00 | 1.487 | 70.2 |
| 5 | 84.267 | d5 | | |
| 6 | 40.497 | 3.34 | 1.487 | 70.2 |
| 7 | 23.564 | 3.78 | | |
| 8 | 54.033 | 3.07 | 1.487 | 70.2 |
| 9 | 32.059 | 5.94 | | |
| 10 | −115.830 | 1.54 | 1.487 | 70.2 |
| 11 | 26.056 | 4.68 | 1.785 | 44.2 |
| 12 | 143.683 | 1.92 | | |
| 13 | −60.194 | 1.39 | 1.772 | 49.6 |
| 14 | −913.783 | d14 | | |
| 15 Stop | ∞ | 4.95 | | |
| 16 | −25.625 | 1.67 | 1.698 | 30.1 |
| 17 | 174.295 | 6.03 | 1.729 | 54.6 |
| 18 | −42.408 | d18 | | |
| 19 | −133.041 | 4.11 | 1.808 | 22.7 |
| 20 | −45.261 | d20 | | |
| 21 | 36.945 | 6.26 | 1.808 | 22.7 |
| 22 | 114.965 | 1.54 | | |
| 23 | −3067.535 | 8.34 | 1.729 | 54.6 |
| 24 | −111.850 | 2.55 | | |
| 25 | −216.994 | 2.37 | 1.805 | 25.4 |
| 26 | 22.188 | 8.10 | 1.603 | 60.6 |
| 27 | −88.734 | 1.37 | | |
| 28 | −41.221 | 1.94 | 1.806 | 33.2 |
| 29 | 42.108 | 6.53 | 1.487 | 70.2 |
| 30 | −62.148 | 7.74 | | |
| 31 | 2998.418 | 3.47 | 1.497 | 81.5 |
| 32 | −107.524 | d32 | | |
| 33 | 79.808 | 5.30 | 1.805 | 25.4 |
| 34 | −414.794 | 4.50 | | |
| 35 | ∞ | 1.50 | | |
| 36 | ∞ | 28.00 | 1.516 | 64.1 |
| 37 | ∞ | 7.82 | 1.516 | 64.1 |
| 38 | ∞ | 2.04 | | |
| 39 | ∞ | 19.50 | 1.805 | 25.4 |
| 40 | ∞ | 3.10 | | |
| 41 | ∞ | 1.32 | 1.516 | 64.1 |
| 42 | ∞ | 2.08 | | |
| 43 | ∞ | 0.70 | 1.516 | 64.1 |
| 44 | ∞ | 1.24 | | |

Various data
Zoom ratio 1.96795

|  | Wide-angle end | Middle | Telephoto end |
|---|---|---|---|
| Focal length | 53.7698 | 78.4359 | 105.816 |
| F-number | 2.04502 | 2.50000 | 2.80000 |
| Viewing angle | 27.4047 | 18.9777 | 14.1253 |
| Image height | 13.1100 | 13.1100 | 13.1100 |
| Lens configuration length | 172.006 | 171.119 | 170.820 |
| BF | 71.8154 | 71.8154 | 71.8154 |

-continued

| Distance during zooming | | | |
|---|---|---|---|
| d0 | 5390.00 | 8460.00 | 10500.00 |
| d5 | 10.84 | 20.19 | 27.08 |
| d14 | 28.39 | 12.80 | 1.70 |
| d18 | 1.89 | 2.16 | 1.04 |
| d20 | 12.50 | 5.21 | 0.90 |
| d32 | 2.20 | 14.57 | 23.90 |

Figure 8A:
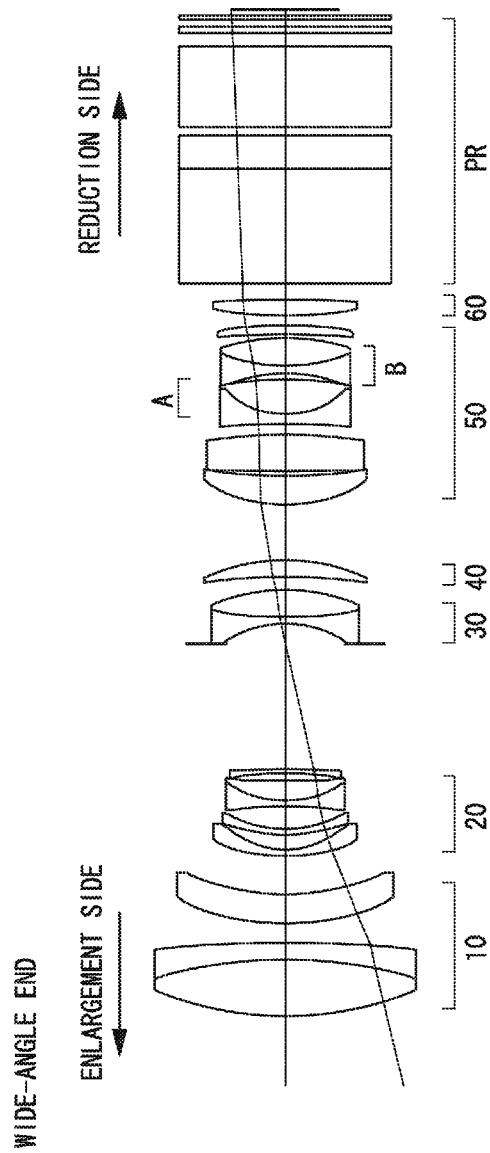
FIGS. 8A and 8B are sectional views of a zoom lens and an optical element disposed between the zoom lens and a light modulation element according to a fourth exemplary embodiment of the present invention.
Figure 8B:
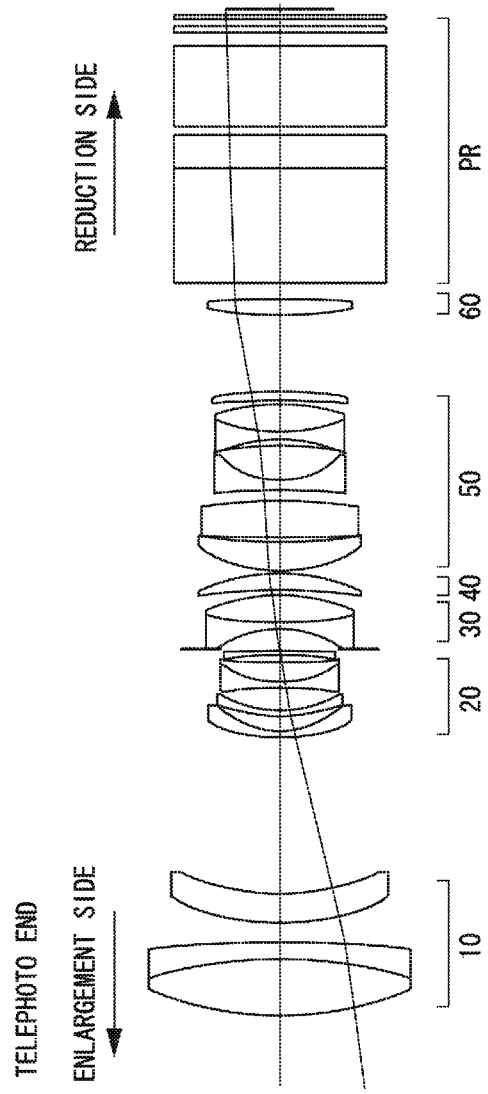
Figure 9A:
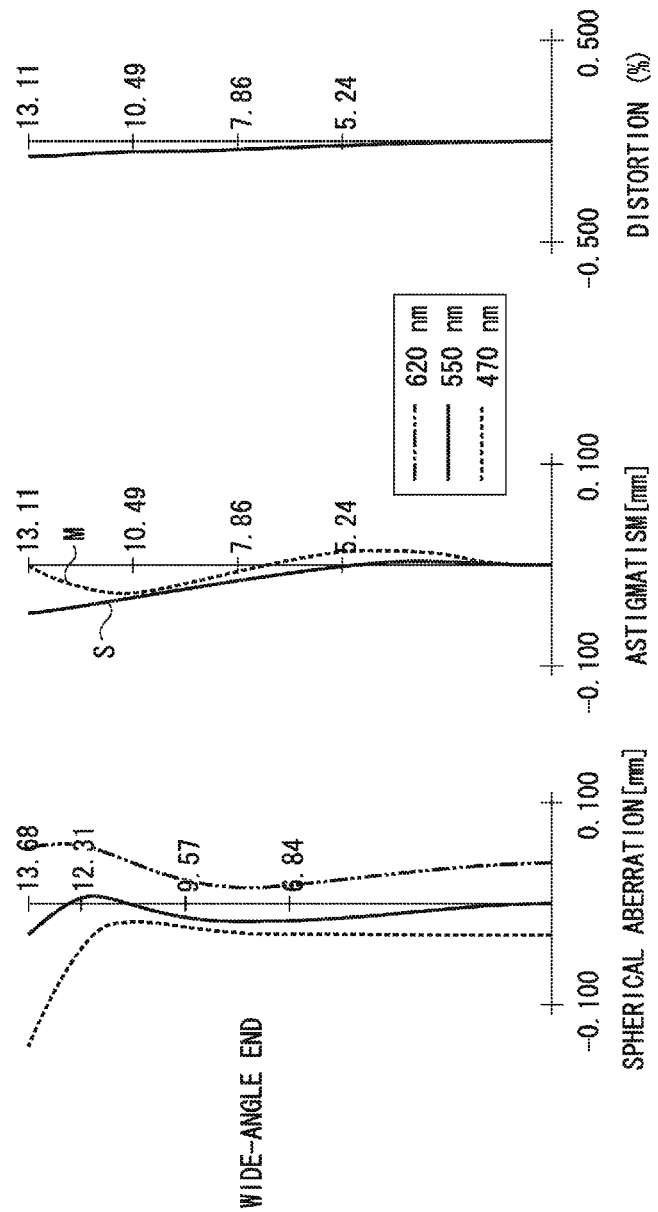

FIGS. 8A and 8B illustrate sectional views of a zoom lens, and an optical element disposed between the zoom lens and a light modulation element according to a fourth exemplary embodiment of the present invention. A numerical example 4 of the fourth exemplary embodiment is illustrated below. FIGS. 9A and 9B illustrate various aberration diagrams of the numerical example 4. The zoom lens according to the fourth exemplary embodiment also satisfies Conditions (1a) to (15a).

The fourth exemplary embodiment is also a design example directed to securement of brighter F-number as compared with the first exemplary embodiment similar to the third exemplary embodiment.

The fourth exemplary embodiment differs from the third exemplary embodiment in that the principal point distance between the first lens unit 10 and the second lens unit 20 is longer and the refractive power of the first lens unit 10 and the second lens unit 20 is weak at each of the wide-angle end and the telephoto end. In addition, the fourth exemplary embodiment differs from the third exemplary embodiment in that the amount of zoom movement of the second lens unit 20 is large and the amount of zoom movement of the fifth lens unit 50 located on the most reduction side is small.

In the zoom lens according to the fourth exemplary embodiment as well, it is possible to obtain the same effects as those in the first exemplary embodiment.

Numerical Example 4

| | r | d | nd | vd |
|---|---|---|---|---|
| OBJ | ∞ | d0 | | |
| 1 | 81.183 | 14.04 | 1.487 | 70.2 |
| 2 | −114.691 | 4.23 | 1.723 | 37.9 |
| 3 | −308.109 | 4.56 | | |
| 4 | 59.709 | 6.99 | 1.487 | 70.2 |
| 5 | 55.751 | d5 | | |
| 6 | 44.277 | 1.48 | 1.487 | 70.2 |
| 7 | 22.321 | 3.77 | | |
| 8 | 45.199 | 1.32 | 1.487 | 70.2 |
| 9 | 31.665 | 5.36 | | |
| 10 | −80.699 | 1.53 | 1.487 | 70.2 |
| 11 | 25.482 | 4.99 | 1.785 | 44.2 |
| 12 | 158.250 | 1.52 | | |
| 13 | −97.934 | 1.34 | 1.772 | 49.6 |
| 14 | −185.530 | d14 | | |
| 15 Stop | ∞ | 4.91 | | |
| 16 | −25.572 | 1.63 | 1.698 | 30.1 |
| 17 | 86.629 | 6.85 | 1.729 | 54.6 |
| 18 | −43.241 | d18 | | |
| 19 | −127.233 | 3.94 | 1.808 | 22.7 |
| 20 | −47.086 | d20 | | |
| 21 | 36.381 | 6.98 | 1.808 | 22.7 |
| 22 | 114.965 | 1.52 | | |
| 23 | 11107.850 | 8.66 | 1.729 | 54.6 |
| 24 | −112.994 | 2.47 | | |
| 25 | −240.893 | 2.68 | 1.805 | 25.4 |
| 26 | 21.369 | 8.26 | 1.603 | 60.6 |
| 27 | −80.911 | 1.56 | | |
| 28 | −38.060 | 1.92 | 1.806 | 33.2 |
| 29 | 39.704 | 6.69 | 1.487 | 70.2 |
| 30 | −56.393 | 0.95 | | |
| 31 | −160.674 | 2.23 | 1.497 | 81.5 |
| 32 | −92.096 | d32 | | |
| 33 | 86.775 | 4.23 | 1.805 | 25.4 |
| 34 | −207.912 | 2.83 | | |
| 35 | ∞ | 1.50 | | |
| 36 | ∞ | 28.00 | 1.516 | 64.1 |
| 37 | ∞ | 7.82 | 1.516 | 64.1 |
| 38 | ∞ | 2.04 | | |
| 39 | ∞ | 19.50 | 1.805 | 25.4 |
| 40 | ∞ | 3.10 | | |
| 41 | ∞ | 1.32 | 1.516 | 64.1 |
| 42 | ∞ | 2.08 | | |
| 43 | ∞ | 0.70 | 1.516 | 64.1 |
| 44 | ∞ | 1.24 | | |

Various data
Zoom ratio 1.97578

| | Wide-angle end | Middle | Telephoto end |
|---|---|---|---|
| Focal length | 53.2149 | 74.0379 | 105.141 |
| F-number | 2.04502 | 2.50000 | 2.80000 |
| Viewing angle | 27.6795 | 20.0827 | 14.2149 |
| Image height | 13.1100 | 13.1100 | 13.1100 |
| Lens configuration length | 175.889 | 174.103 | 173.503 |
| BF | 70.1424 | 70.1424 | 70.1424 |

| Distance during zooming | | | |
|---|---|---|---|
| d0 | 5390.00 | 8460.00 | 10500.00 |
| d5 | 9.74 | 23.23 | 37.57 |
| d14 | 30.40 | 14.85 | 0.05 |
| d18 | 3.17 | 2.98 | 0.93 |
| d20 | 13.81 | 5.40 | 0.63 |
| d32 | 2.16 | 11.03 | 17.72 |

Figure 10A:
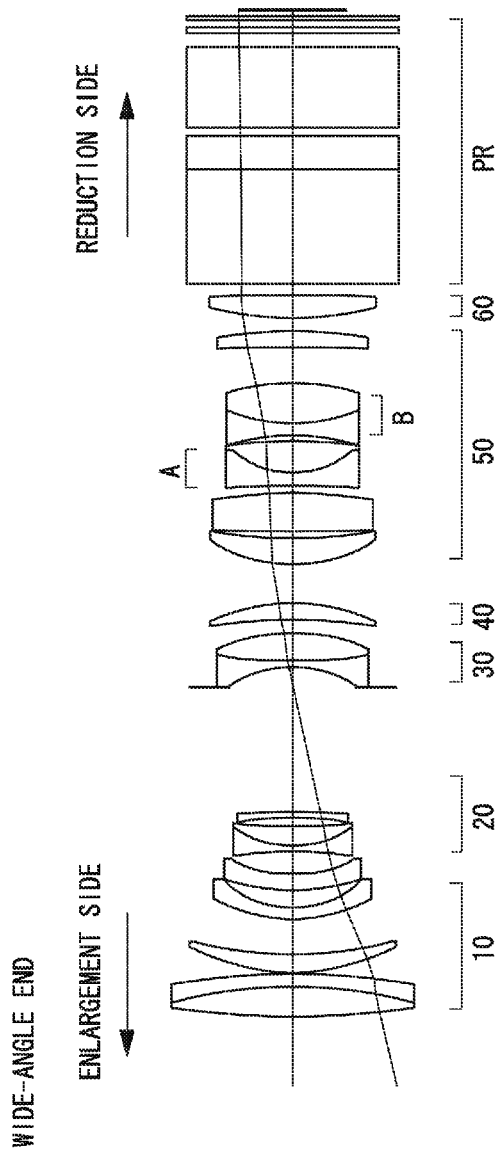
Figure 11A:
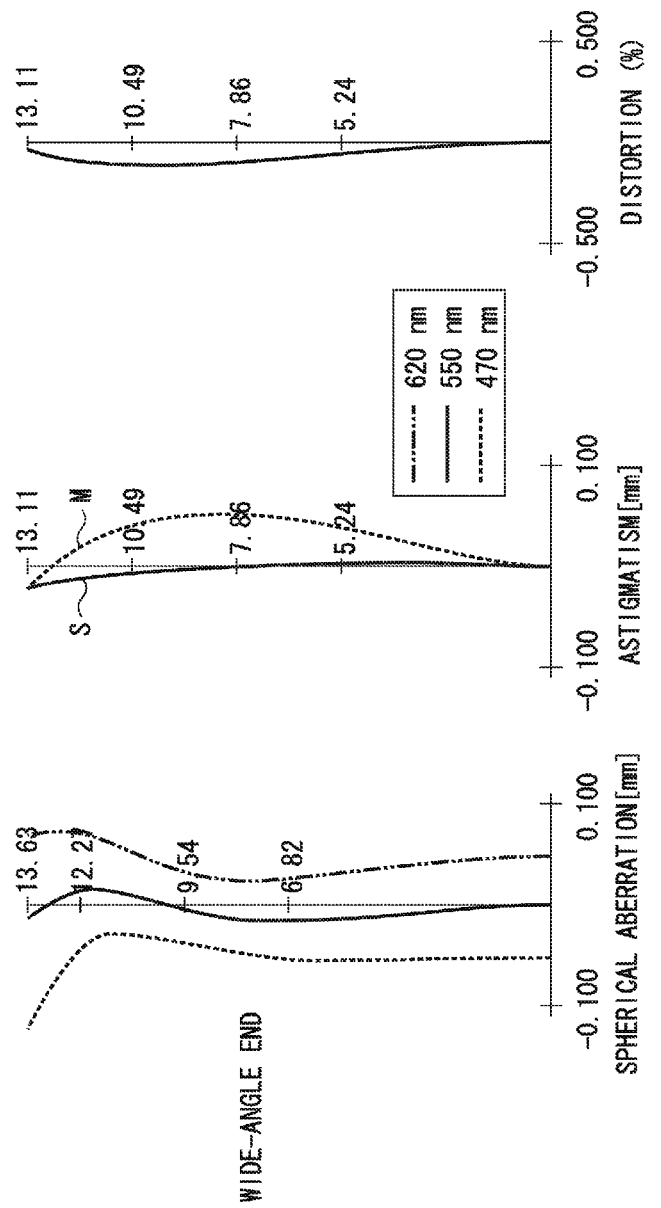

FIGS. 10A and 10B illustrate sectional views of a zoom lens, and an optical element disposed between the zoom lens and a light modulation element according to a fifth exemplary embodiment of the present invention. A numerical example 5 of the fifth exemplary embodiment is illustrated below. FIGS. 11A and 11B illustrate various aberration diagrams of the numerical example 5. The zoom lens according to the fifth exemplary embodiment also satisfies Conditions (1a) to (15a).

The fifth exemplary embodiment is also a design example directed to securement of brighter F-number as compared with the first exemplary embodiment similar to the third exemplary embodiment.

The zoom lens according to the fifth exemplary embodiment differs from the zoom lens according to the third exemplary embodiment in that the principal point distance between the first lens unit 10 and the second lens unit 20 is made shorter at each of the wide-angle end and the telephoto end. In addition, the zoom lens according to the fifth exemplary embodiment differs from the zoom lens according to the third exemplary embodiment in that the principal point distance between the stop ST and the fifth lens unit 50 located on the most reduction side and the principal point distance between the stop ST and the sixth lens unit 60 functioning as the final lens unit are made longer.

In the zoom lens according to the fifth exemplary embodiment as well, it is possible to obtain the same effects as those in the zoom lens according to the first exemplary embodiment.

Numerical Example 5

|  | r | d | nd | vd |
|---|---|---|---|---|
| OBJ | ∞ | d0 | | |
| 1 | 203.054 | 7.16 | 1.487 | 70.2 |
| 2 | −110.110 | 3.24 | 1.723 | 37.9 |
| 3 | −162.644 | 0.23 | | |
| 4 | 53.130 | 4.28 | 1.487 | 70.2 |
| 5 | 89.152 | d5 | | |
| 6 | 39.195 | 2.96 | 1.487 | 70.2 |
| 7 | 24.024 | 4.18 | | |
| 8 | 56.203 | 3.86 | 1.487 | 70.2 |
| 9 | 31.839 | 5.40 | | |
| 10 | −115.883 | 1.54 | 1.487 | 70.2 |
| 11 | 26.032 | 4.88 | 1.785 | 44.2 |
| 12 | 163.493 | 1.94 | | |
| 13 | −64.582 | 1.38 | 1.772 | 49.6 |
| 14 | −395.315 | d14 | | |
| 15 Stop | ∞ | 4.90 | | |
| 16 | −26.308 | 1.62 | 1.698 | 30.1 |
| 17 | 135.086 | 6.60 | 1.729 | 54.6 |
| 18 | −42.063 | d18 | | |
| 19 | −128.365 | 4.03 | 1.808 | 22.7 |
| 20 | −46.560 | d20 | | |
| 21 | 37.117 | 6.33 | 1.808 | 22.7 |
| 22 | 114.965 | 1.60 | | |
| 23 | 21298.686 | 9.38 | 1.729 | 54.6 |
| 24 | −109.960 | 1.82 | | |
| 25 | −220.324 | 3.22 | 1.805 | 25.4 |
| 26 | 22.020 | 7.74 | 1.603 | 60.6 |
| 27 | −91.209 | 1.38 | | |
| 28 | −41.557 | 2.84 | 1.806 | 33.2 |
| 29 | 40.892 | 9.60 | 1.487 | 70.2 |
| 30 | −68.370 | 8.76 | | |
| 31 | −806.429 | 3.91 | 1.497 | 81.5 |
| 32 | −107.099 | d32 | | |
| 33 | 79.671 | 5.60 | 1.805 | 25.4 |
| 34 | −417.506 | 1.62 | | |
| 35 | ∞ | 1.50 | | |
| 36 | ∞ | 28.00 | 1.516 | 64.1 |
| 37 | ∞ | 7.82 | 1.516 | 64.1 |
| 38 | ∞ | 2.04 | | |
| 39 | ∞ | 19.50 | 1.805 | 25.4 |
| 40 | ∞ | 3.10 | | |
| 41 | ∞ | 1.32 | 1.516 | 64.1 |
| 42 | ∞ | 2.08 | | |
| 43 | ∞ | 0.70 | 1.516 | 64.1 |
| 44 | ∞ | 1.24 | | |

| Various data Zoom ratio 1.96774 | | | |
|---|---|---|---|
| | Wide-angle end | Middle | Telephoto end |
| Focal length | 53.7358 | 81.2292 | 105.738 |
| F-number | 2.04502 | 2.50000 | 2.80000 |
| Viewing angle | 27.4214 | 18.3364 | 14.1356 |
| Image height | 13.1100 | 13.1100 | 13.1100 |
| Lens configuration length | 174.969 | 174.019 | 173.699 |
| BF | 68.9239 | 68.9239 | 68.9239 |
| Distance during zooming | | | |
| d0 | 5390.00 | 8460.00 | 10500.00 |
| d5 | 8.53 | 19.66 | 25.75 |
| d14 | 30.29 | 11.03 | 0.60 |
| d18 | 3.26 | 2.47 | 0.33 |
| d20 | 9.31 | 4.31 | 0.68 |
| d32 | 3.19 | 16.16 | 25.95 |

Figure 12A:
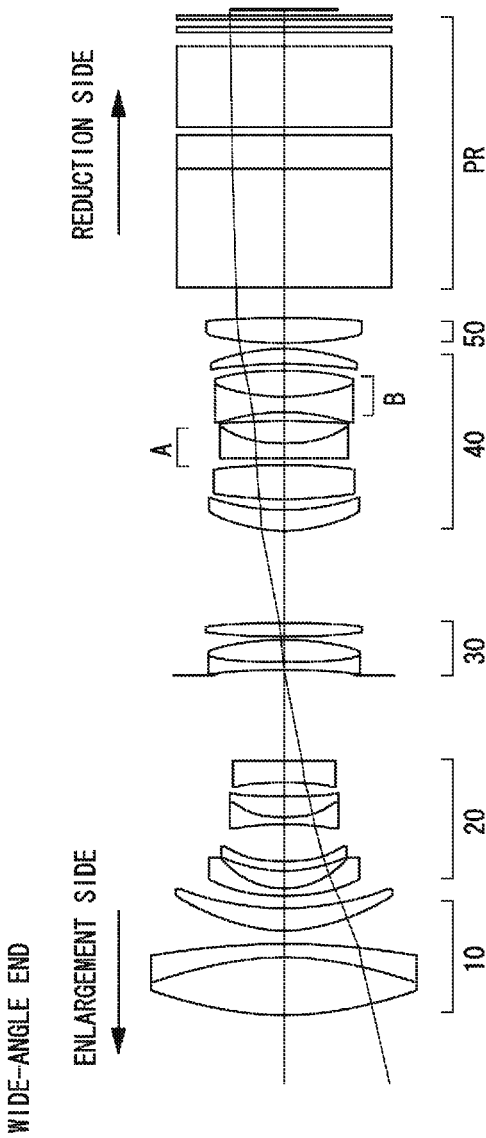
FIGS. 12A and 12B are sectional views of a zoom lens and an optical element disposed between the zoom lens and a light modulation element according to a sixth exemplary embodiment of the present invention.
Figure 12B:
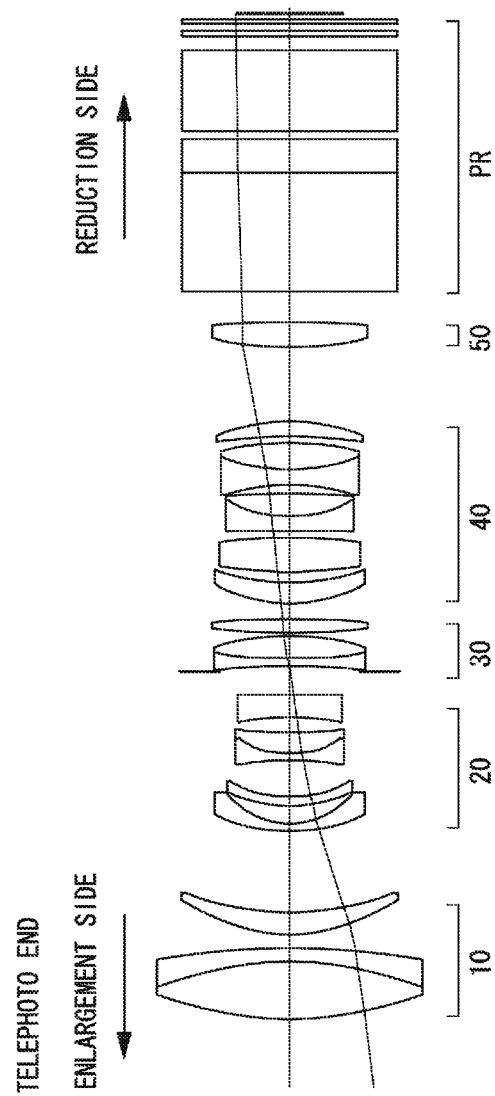
Figure 13A:
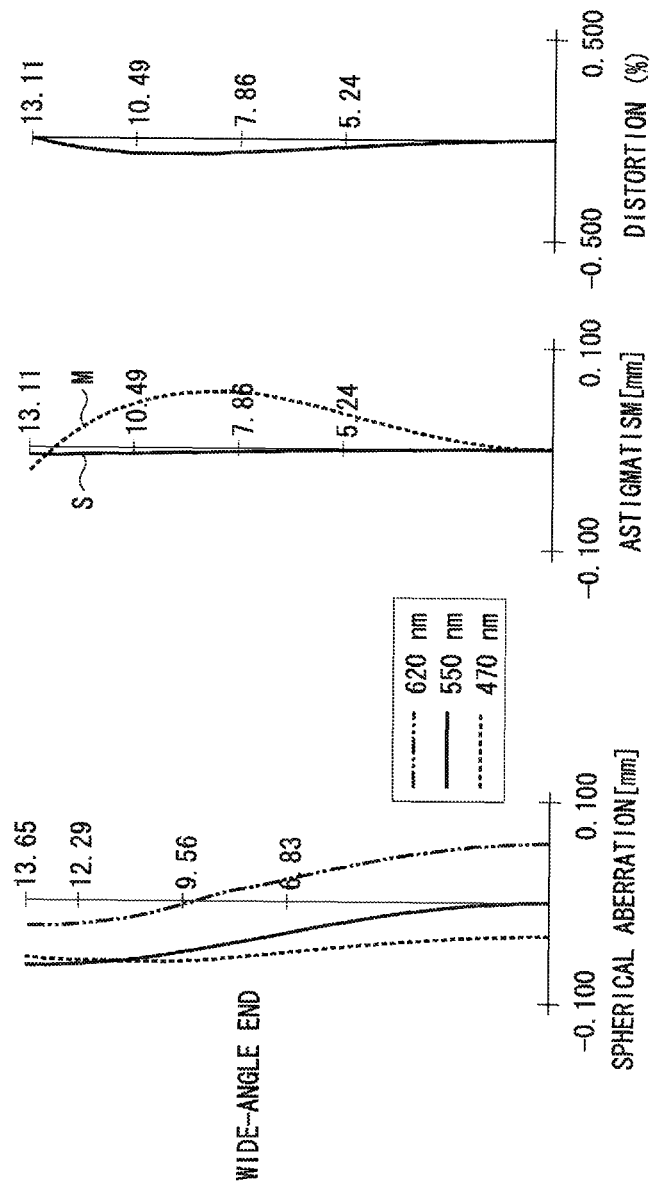

FIGS. 12A and 12B illustrate sectional views of a zoom lens, and an optical element disposed between the zoom lens and a light modulation element according to a sixth exemplary embodiment of the present invention. A numerical example 6 of the sixth exemplary embodiment is illustrated below. FIGS. 13A and 13B illustrate various aberration diagrams of the numerical example 6. The zoom lens according to the sixth exemplary embodiment also satisfies Conditions (1a) to (15a).

The sixth exemplary embodiment differs from the first exemplary embodiment in that the sixth exemplary embodiment includes five lens units. A lens unit corresponding to the zooming lens unit according to the first exemplary embodiment is the fourth lens unit 40, and a lens unit corresponding to the final lens unit is the fifth lens unit 50. Furthermore, the sixth exemplary embodiment is a design example directed to obtain F-number that is brighter as compared with the first embodiment.

Since the number of lens units is reduced by one, refractive power of the first lens unit 10 and the second lens unit 20 becomes stronger than that in the zoom lens including six lens units.

In the zoom lens according to the sixth exemplary embodiment as well, it is possible to obtain the same effects as those in the zoom lens according to the first exemplary embodiment.

Numerical Example 6

|  | r | d | nd | vd |
|---|---|---|---|---|
| OBJ | ∞ | d0 | | |
| 1 | 85.594 | 13.54 | 1.487 | 70.2 |
| 2 | −85.594 | 3.34 | 1.723 | 37.9 |
| 3 | −172.821 | 3.02 | | |
| 4 | 42.298 | 5.33 | 1.487 | 70.2 |
| 5 | 66.644 | d5 | | |
| 6 | 44.977 | 1.73 | 1.487 | 70.2 |
| 7 | 19.277 | 4.27 | | |
| 8 | 38.275 | 2.11 | 1.487 | 70.2 |
| 9 | 32.641 | 8.74 | | |
| 10 | −92.509 | 1.65 | 1.487 | 70.2 |
| 11 | 21.145 | 4.84 | 1.785 | 44.2 |
| 12 | 64.071 | 3.55 | | |
| 13 | −53.730 | 5.02 | 1.772 | 49.6 |
| 14 | 624.016 | d14 | | |
| 15 Stop | ∞ | 1.14 | | |
| 16 | −178.597 | 1.84 | 1.698 | 30.1 |
| 17 | 103.393 | 5.39 | 1.729 | 54.6 |
| 18 | −65.027 | 0.67 | | |
| 19 | 197.887 | 3.19 | 1.808 | 22.7 |
| 20 | −326.338 | d20 | | |
| 21 | 37.154 | 4.76 | 1.808 | 22.7 |
| 22 | 45.299 | 2.84 | | |
| 23 | 126.978 | 8.03 | 1.729 | 54.6 |
| 24 | −189.398 | 1.48 | | |
| 25 | 491.100 | 3.76 | 1.805 | 25.4 |
| 26 | 32.703 | 5.15 | 1.603 | 60.6 |
| 27 | −519.550 | 2.31 | | |
| 28 | −45.293 | 3.55 | 1.806 | 33.2 |
| 29 | 45.293 | 6.16 | 1.487 | 70.2 |
| 30 | −73.442 | 1.69 | | |
| 31 | −114.289 | 3.63 | 1.497 | 81.5 |
| 32 | −44.423 | d32 | | |
| 33 | 74.760 | 5.89 | 1.805 | 25.4 |
| 34 | −418.278 | 5.78 | | |
| 35 | ∞ | 1.50 | | |
| 36 | ∞ | 28.00 | 1.516 | 64.1 |
| 37 | ∞ | 7.82 | 1.516 | 64.1 |
| 38 | ∞ | 2.04 | | |
| 39 | ∞ | 19.50 | 1.805 | 25.4 |
| 40 | ∞ | 3.10 | | |
| 41 | ∞ | 1.32 | 1.516 | 64.1 |
| 42 | ∞ | 2.08 | | |
| 43 | ∞ | 0.70 | 1.516 | 64.1 |
| 44 | ∞ | 1.24 | | |

-continued

Various data
Zoom ratio 1.97000

|  | Wide-angle end | Middle | Telephoto end |
|---|---|---|---|
| Focal length | 54.1236 | 60.0793 | 106.090 |
| F-number | 2.04502 | 2.50000 | 2.80000 |
| Viewing angle | 27.2323 | 24.6192 | 14.0891 |
| Image height | 13.1100 | 13.1100 | 13.1100 |
| Lens configuration length | 165.181 | 164.648 | 164.468 |
| BF | 73.0882 | 73.0882 | 73.0882 |
| Distance during zooming | | | |
| d0 | 5390.00 | 8460.00 | 10500.00 |
| d5 | 3.07 | 5.56 | 19.08 |
| d14 | 20.43 | 18.54 | 5.62 |
| d20 | 21.90 | 15.76 | 3.52 |
| d32 | 1.14 | 6.15 | 17.60 |

Table 1 illustrates values of Conditions (1a) to (15a) according to the first to sixth exemplary embodiments collectively. In each cell on a row of "Nn–Np", a value on the upper part indicates a value of "Nn–Np" of the cemented lens A, whereas a value on the lower part indicates a value of "Nn–Np" of the cemented lens B.

TABLE 1

|  | First exemplary embodiment | Second exemplary embodiment | Third exemplary embodiment |
|---|---|---|---|
| e12w/L | 0.19 | 0.22 | 0.19 |
| e2w/L | 0.21 | 0.16 | 0.20 |
| e12t/L | 0.32 | 0.34 | 0.28 |
| e2t/L | 0.07 | 0.04 | 0.05 |
| ehw/L | 0.28 | 0.11 | 0.02 |
| eht/L | 0.38 | 0.26 | 0.06 |
| elw/L | 0.26 | 0.32 | 0.37 |
| elt/L | 0.26 | 0.30 | 0.43 |
| f1/√(fw/ft) | 1.63 | 1.70 | 1.49 |
| f2/√(fw/ft) | −0.54 | −0.51 | −0.51 |
| fh/√(fw/ft) | 3.26 | 2.48 | 2.32 |
| fL/√(fw/ft) | 0.93 | 0.93 | 1.10 |
| X2/L | 0.14 | 0.13 | 0.10 |
| Xh/L | 0.10 | 0.13 | 0.13 |
| Nn − Np | 0.20 | 0.20 | 0.20 |
|  | 0.29 | 0.29 | 0.32 |

|  | Fourth exemplary embodiment | Fifth exemplary embodiment | Sixth exemplary embodiment |
|---|---|---|---|
| e12w/L | 0.23 | 0.16 | 0.17 |
| e2w/L | 0.23 | 0.21 | 0.19 |
| e12t/L | 0.40 | 0.26 | 0.27 |
| e2t/L | 0.06 | 0.04 | 0.10 |
| ehw/L | 0.16 | 0.04 | 0.02 |
| eht/L | 0.26 | 0.09 | 0.10 |
| elw/L | 0.27 | 0.39 | 0.36 |
| elt/L | 0.27 | 0.45 | 0.35 |
| f1/√(fw/ft) | 2.11 | 1.55 | 1.16 |
| f2/√(fw/ft) | −0.70 | −0.59 | −0.32 |
| fh/√(fw/ft) | 2.83 | 2.75 | 4.89 |
| fL/√(fw/ft) | 1.00 | 1.10 | 1.04 |
| X2/L | 0.18 | 0.11 | 0.10 |
| Xh/L | 0.09 | 0.13 | 0.10 |
| Nn − Np | 0.20 | 0.20 | 0.20 |
|  | 0.32 | 0.32 | 0.32 |

Figure 14:
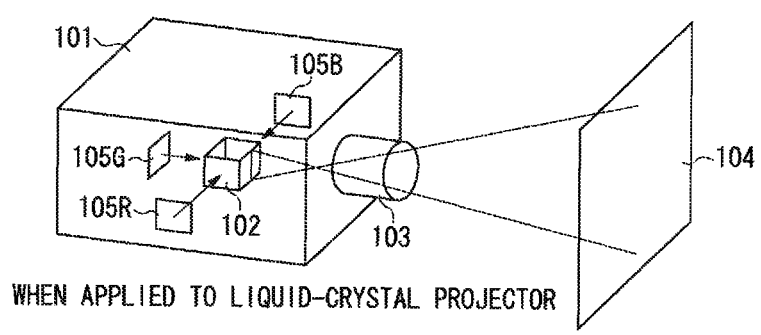
FIG. 14 is a schematic configuration diagram of a projector according to a seventh embodiment of the present invention.

FIG. 14 illustrates a schematic configuration diagram of a projector 101 using any zoom lens according to the first to sixth exemplary embodiments. A zoom lens 103 functions as a projection lens, which projects modulated rays from liquid crystal panels 105R, 105G, and 105B, as a light modulation element illuminated by using light from a light source, onto a projection surface 104 such as a screen.

Incidentally, the projector 101 may be a projector to which the zoom lens 103 is attached to be attachable and detachable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-203003 filed Sep. 14, 2012, which is hereby incorporated by reference herein in its entirety.

What is claimed is:

1. A zoom lens comprising, in order from an enlargement side to a reduction side:

a first lens unit having positive refractive power and not moving for zooming;

a second lens unit having negative refractive power and moving for zooming;

a stop;

a zooming lens unit having positive refractive power and moving for zooming; and a final lens unit having positive refractive power and not moving for zooming, wherein during zooming from a wide-angle end to a telephoto end, the second lens unit moves to the reduction side and the zooming lens unit moves to the enlargement side, the zooming lens unit includes a cemented lens, the cemented lens has a negative lens and a positive lens cemented in order from the enlargement side, and a cemented surface of the cemented lens has a convex shape on the enlargement side, the zoom lens satisfies $$0.15 < Nn-Np < 0.35$$

where a refractive index of the negative lens is denoted by Nn and a refractive index of the positive lens is denoted by Np, and the zoom lens satisfies $$0.15 < e12w/L < 0.25$$

$$0.15 < e2w/L < 0.25$$

$$0.25 < e12t/L < 0.40$$

$$0.03 < e2t/L < 0.11$$

where a distance between a principal point of the first lens unit and a principal point of the second lens unit at the wide-angle end is denoted by e12w, a distance between the principal point of the second lens unit and the stop at the wide-angle end is denoted by e2w, a distance between a principal point of the first lens unit and a principal point of the second lens unit at the telephoto end is denoted by e12t, a distance between the principal point of the second lens unit and the stop at the telephoto end is denoted by e2t, and a distance between a surface vertex on the enlargement side of a lens disposed on the most enlargement side and a surface vertex on the reduction side of a lens disposed on the most reduction side is denoted by L.

2. The zoom lens according to claim 1, wherein the zoom lens satisfies $$1.10 < f1/\sqrt{(fw*ft)} < 2.20$$

$$-0.75 < f2/\sqrt{(fw*ft)} < -0.30$$

$$2.25 < fh/\sqrt{(fw \cdot ft)} < 5.00$$

$$0.90 < fL/\sqrt{(fw \cdot ft)} < 1.20$$

where a focal length of the first lens unit is denoted by f1, a focal length of the second lens unit is denoted by f2, a focal length of the zooming lens unit is denoted by fh, a focal length of the final lens unit is denoted by fL, a focal length of the entire zoom lens at the wide-angle end is denoted by fw, and a focal length of the entire zoom lens at the telephoto end is denoted by ft.

3. The zoom lens according to claim 1, wherein the zoom lens satisfies $$0.09 < X2/L < 0.18$$

$$0.08 < Xh/L < 0.14$$

where an amount of movement of the second lens unit for zooming from the wide-angle end to the telephoto end is denoted by X2, and an amount of movement of the zooming lens unit for zooming from the wide-angle end to the telephoto end is denoted by Xh.

4. The zoom lens according to claim 1, wherein the zoom lens satisfies $$0.01 < ehw/L < 0.30$$

$$0.25 < elw/L < 0.45$$

$$0.04 < eht/L < 0.40$$

$$0.25 < elt/L < 0.50$$

where a distance between the stop and a principal point of the zooming lens unit at the wide-angle end is denoted by ehw, a distance between the stop and a principal point of the zooming lens unit at the telephoto end is denoted by eht, a distance between the stop and a principal point of the final lens unit at the wide-angle end is denoted by elw, and a distance between the stop and a principal point of the final lens unit at the telephoto end is denoted by elt.

5. The zoom lens according to claim 1, wherein the zooming lens unit is a lens unit disposed on the most reduction side among lens units that move for zooming.

6. A projector comprising:
a light modulation element configured to modulate light from a light source; and
a zoom lens configured to project light received via the light modulation element onto a projection surface,
wherein the zoom lens includes, in order from an projection surface side to a light modulation element side:
a first lens unit having positive refractive power and not moving for zooming;
a second lens unit having negative refractive power and moving for zooming;
a stop;
a zooming lens unit having positive refractive power and moving for zooming; and
a final lens unit having positive refractive power and not moving for zooming,
wherein
during zooming from a wide-angle end to a telephoto end, the second lens unit moves to the light modulation element side and the zooming lens unit moves to the projection surface side,
the zooming lens unit includes a cemented lens, the cemented lens has a negative lens and a positive lens cemented in order from the projection surface side, and a cemented surface of the cemented lens has a convex shape on the projection surface side,
the zoom lens satisfies $$0.15 < Nn - Np < 0.35$$

where a refractive index of the negative lens is denoted by Nn and a refractive index of the positive lens is denoted by Np, and
the zoom lens satisfies $$0.15 < e12w/L < 0.25$$

$$0.15 < e2w/L < 0.25$$

$$0.25 < e12t/L < 0.40$$

$$0.03 < e2t/L < 0.11$$

where a distance between a principal point of the first lens unit and a principal point of the second lens unit at the wide-angle end is denoted by e12w, a distance between the principal point of the second lens unit and the stop at the wide-angle end is denoted by e2w, a distance between a principal point of the first lens unit and a principal point of the second lens unit at the telephoto end is denoted by e12t, a distance between the principal point of the second lens unit and the stop at the telephoto end is denoted by e2t, and a distance between a surface vertex on the enlargement side of a lens disposed on the most enlargement side and a surface vertex on the reduction side of a lens disposed on the most reduction side is denoted by L.

* * * * *